(12) United States Patent
Dong et al.

(10) Patent No.: US 10,887,394 B2
(45) Date of Patent: Jan. 5, 2021

(54) MECHANISM AND SERVICE FOR DEVICE NAMING

(71) Applicant: Convida Wireless, LLC, Wilmington, DE (US)

(72) Inventors: Lijun Dong, San Diego, CA (US); Xu Li, Plainsboro, NJ (US); Zhuo Chen, Claymont, DE (US); Chonggang Wang, Princeton, NJ (US); Quang Ly, North Wales, PA (US); Shamim Akbar Rahman, Cote St. Luc (CA); Guang Lu, Thornhill (CA)

(73) Assignee: Convida Wireless, LLC, Wilmington, DE (US)

( * ) Notice: Subject to any disclaimer, the term of this patent is extended or adjusted under 35 U.S.C. 154(b) by 5 days.

(21) Appl. No.: 14/815,298

(22) Filed: Jul. 31, 2015

(65) Prior Publication Data

US 2016/0036764 A1 Feb. 4, 2016

Related U.S. Application Data

(60) Provisional application No. 62/031,390, filed on Jul. 31, 2014.

(51) Int. Cl.
*H04L 29/08* (2006.01)
*H04L 29/12* (2006.01)
(Continued)

(52) U.S. Cl.
CPC .............. *H04L 67/12* (2013.01); *H04L 45/22* (2013.01); *H04L 45/306* (2013.01); *H04L 61/15* (2013.01);
(Continued)

(58) Field of Classification Search
CPC ....... H04L 67/12; H04L 45/22; H04L 45/306; H04L 45/44; H04L 61/15; H04L 61/3025;
(Continued)

(56) References Cited

U.S. PATENT DOCUMENTS

| 6,421,731 | B1 * | 7/2002 | Ciotti, Jr. | ............ H04W 40/248 709/238 |
| 6,816,460 | B1 * | 11/2004 | Ahmed | ................... H04L 45/04 370/238 |

(Continued)

FOREIGN PATENT DOCUMENTS

| EP | 2 720 434 A1 | 4/2014 |
| JP | 2001-084210 A | 3/2001 |
| JP | 2014-103607 A | 6/2014 |

OTHER PUBLICATIONS

Chang et al, "Robust Indoor Positioning Using differential Wi-Fi Access Points", IEEE Transaction on Consumer Electronics, Aug. 2010, 56(3),1860-1867.

(Continued)

*Primary Examiner* — Robert M Morlan
(74) *Attorney, Agent, or Firm* — BakerHostetler

(57) ABSTRACT

A naming scheme for IoT Devices can address the problem that the existing naming schemes of the IoT devices do not support device discovery and group operation efficiently. An IoT Device Name Service (IDNS) can be in charge of how the device name is generated from the location and other context information; updated due to the location change or context variation; and discovered. The IoT Devices can be routed by their names using a Name Routing Protocol (NRP). With the name scheme and NRP, the IoT Devices do not need to implement the full protocol stack to enable the direct communication between them.

22 Claims, 36 Drawing Sheets

(51) Int. Cl.
*H04L 12/725* (2013.01)
*H04L 12/707* (2013.01)
*H04L 12/721* (2013.01)
*H04W 4/70* (2018.01)

(52) U.S. Cl.
CPC ........ *H04L 61/3025* (2013.01); *H04L 61/609* (2013.01); *H04L 61/6022* (2013.01); *H04L 45/44* (2013.01); *H04L 61/2076* (2013.01); *H04L 67/327* (2013.01); *H04W 4/70* (2018.02)

(58) Field of Classification Search
CPC ............... H04L 61/6022; H04L 61/609; H04L 61/2076; H04L 67/327; H04W 4/005
See application file for complete search history.

(56) References Cited

U.S. PATENT DOCUMENTS

| | | | | |
|---|---|---|---|---|
| 7,725,375 | B2* | 5/2010 | Shepherd | G06Q 40/04 705/35 |
| 8,073,972 | B2 | 12/2011 | Jansen | |
| 8,645,509 | B2 | 2/2014 | Carriere | |
| 8,874,708 | B2 | 10/2014 | Jansen | |
| 9,369,429 | B1* | 6/2016 | Whittle | H04L 61/2596 |
| 2003/0037167 | A1 | 2/2003 | Garcia-Luna-Aceves et al. | |
| 2004/0083210 | A1* | 4/2004 | Ochiai | G06F 17/30241 |
| 2005/0135231 | A1* | 6/2005 | Bellovin | H04L 45/02 370/216 |
| 2009/0274128 | A1* | 11/2009 | Zhang | H04L 41/12 370/338 |
| 2014/0156820 | A1* | 6/2014 | Moineau | H04L 41/0813 709/223 |
| 2014/0173124 | A1* | 6/2014 | Velayudhapillai | H04L 61/2046 709/228 |
| 2016/0119435 | A1* | 4/2016 | Ben Fredj | H04L 67/16 370/310 |

OTHER PUBLICATIONS

Conta et al, "Internet Control Message Protocol (ICMPv6) for the Internet Protocol Version 6 (IPv6) Specification", Network Working Group, RFC #4443, Mar. 2006, 24 pages.

Curran et al, An Evaluation of Indoor Location Determination Technologies. Journal of Location Based Services, 5(2), 61-78, Jun. 2011.

Distance-Vector Routing Protocol, Oct. 12, 2015, 5 pages, http://en.wikipedia.org/wiki/distance-vector_RoutingProtocol.

European Telecommunications Standards Institute (ETSI) TS 102 690 V2.1.1 "Machine-to-Machine communications (M2M); Functional Architecture", Oct. 2013, 332 pages.

Gubbi et al, "Internet of Things (IoT): A vision, Architectural Elements, and Future Directions", Future Generation Computer Systems, Sep. 2013, 29(7), 1645-1660.

Hedrick, C. "Routing Information Protocol", Network Working Group, RFC#1058, Jun. 1988, 33 pages.

IEEE Standard for Local and Metropolitan Area Networks, Part 15.4: Low-Rate Wireless Personal Area Networks (LR-WPANs), IEEE Std 802.15.4™-2011, Sep. 5, 2011, 314 pages.

IMSI, International Mobile Subscriber Identity, Sep. 17, 2015, 4 pages, https://en.wikipedia.org/wiki/International_Mobile_Subscriber_Identity.

Malkin, G., "RIP Version 2", Network Working Group, RFC#2453, Nov. 1998, 37 pages.

MSISDN, Oct. 12, 2015, 3 pages, https://en.wikipedia.orq/wiki/MSISDN.

One M2M Functional Architecture, oneM2M-TS-0001 oneM2M Functional Architecture-V-0.4.2., Mar. 4, 2014.

Postel, J. "Internet Control Message Protocol", Network Working Group, RFC# 792, Sep. 1981, 21 pages.

"Radio-frequency identification" Oct. 20, 2015, 15 pages, http://en.wikipedia.org/wiki/Radio-frequency_Identification#Regulation_and_Standardization.

Shelby et al, "CoRE Resource Directory draft-ietf-core-Resource-Directory-01", Dec. 11, 2013, 28 pages.

Shelby et al, "Neighbor Discovery Optimization for IPv6 over Low-Power Wireless Personal Area Networks (6LoWPANs)", Internet Engineering Task Force (IETF), RFC#6775, Nov. 2012, 55 pages.

Zhou et al, "Indoor Elliptical Localization Based on Asynchronous UWB Range Measurement", IEEE Transactions on Instrumentation and Measurement, Jan. 2011, 60(1), 248-257.

International Patent Application No. PCT/US2015/043197: International Search Report and Written Opinion dated Feb. 2, 2016, 18 pages.

International Patent Application No. PCT/US2015/043197: International Preliminary Report dated Feb. 9, 2017.

English Translation of JP Office Action dated Apr. 5, 2018 for JP Application No. 2017504720.

* cited by examiner

| Layer number | Upper Layer Node | Node 1 | ... | Node n |

3702

User Input Panel for
Sub-location Registration Function

Please input the layer number:

Please input the upper-layer node:

Please input the nodes on this layer:

Submit

FIG. 37A

User Input Panel for
Device Name Generation/Update Function — 3704

Please select the operation:

☐ Device Name Registration

Please input node MAC Address:

Please input location and format:

Please input context info. (separated by comma):

☐ Device Name Update

Please input current device name:

Please number of changes:

Please input each of changes (separated by comma):

[Submit]

FIG. 37B

MECHANISM AND SERVICE FOR DEVICE NAMING

CROSS-REFERENCE TO RELATED APPLICATIONS

This application claims priority to U.S. Provisional Ser. No. 62/031,390, filed on Jul. 31, 2014, the contents of which is hereby incorporated herein by reference in its entirety.

BACKGROUND

In the Internet of Things (IoT) paradigm, many of the objects that surround us will be connected to the Internet in one form or another. IoT is an evolution of the current Internet into a network of interconnected objects that not only harvest information from the environment (sensing) and interact with the physical world (actuation/command/control), but also provide services for information transfer, analytics, applications and communications. Only in 2011 did the number of interconnected devices on the planet overtake the actual number of people. Currently there are 9 billion interconnected devices and it is expected to reach 24 billion devices by 2020.

Radio-Frequency Identification (RFID) is the wireless non-contact use of radio-frequency electromagnetic fields to transfer data for the purposes of automatically identifying and tracking tags attached to objects. The tags contain electronically stored information. Tags contain a unique identification number called an Electronic Product Code (EPC), and potentially additional information of interest to manufacturers, healthcare organizations, military organizations, logistics providers, and retailers, or others that need to track the physical location of goods or equipment. When written into the tag by an RFID printer, the tag contains a 96-bit string of data. The first eight bits are a header which identifies the version of the protocol. The next 28 bits identify the organization that manages the data for this tag; the organization number is assigned by the EPC Global consortium. The next 24 bits are an object class, identifying the kind of product; the last 36 bits are a unique serial number for a particular tag. These last two fields are set by the organization that issued the tag. Rather like a Universal Resource Locator (URL), the total electronic product code number can be used as a key into a global database to uniquely identify a particular product.

An IEEE 802.15.4 device has a 48-bit (long) IEEE address, which uniquely identifies the device in a Wireless Personal Area Network (WPAN). In order to extend battery life, shorter addresses (16 bit) are used to shorten the packet sizes and hence the time a device is actively communicating.

The International mobile Subscriber Identity (IMSI) is used to identify the user of a cellular network and is a unique identification associated with all cellular networks. It is stored as a 64-bit field and is sent by the phone to the network. The Mobile Station International Subscriber Directory Number (MSISDN) is a number uniquely identifying a subscription in a Global System for Mobile Communications (GSM) or a Universal Mobile Telecommunications System (UMTS) mobile network. It is the telephone number to the Subscriber Identity Module (SIM) card in a mobile/cellular phone. The MSISDN together with IMSI are two important numbers used for identifying a mobile subscriber. The latter identifies the SIM, i.e. the card inserted into the mobile phone, while the former is used for routing calls to the subscriber. IMSI is often used as a key in the Home Location Register (HLR)("subscriber database") and MSISDN is the number normally dialed to connect a call to the mobile phone. A SIM is uniquely associated to an IMSI, while the MSISDN can change in time, i.e. different MSISDNs can be associated to the SIM.

An Internet Protocol Version 6 (IPv6) address is a numerical label that is used to identify a network interface of a computer or other network node participating in an IPv6 computer network.

IPv6 addresses have a size of 128 bits, which serve the purpose of uniquely identifying an individual network interface of a host, permitting the routing of IP packets between hosts. An IPv6 address is represented as eight groups of four hexadecimal digits, each group representing 16 bits (two octets). The groups are separated by colons (:).

Routing Information Protocol (RIP) was one of the earliest intra-AS Internet routing protocols and is still in widespread use today. RIP uses hop count as a cost metric. Each link has a cost of 1. RIP uses the term hop, which is the number of subnets traversed along the shortest path from source router to destination subnet, including the destination subnet.

FIG. 1 is a diagram that illustrates a portion of an autonomous system (AS) 102. An AS 102 is a collection of connected IP routing prefixes under the control of one or more network operators that presents a common, clearly defined routing policy in the Internet. Routers within the same AS 102 all run the same routing algorithm and have information about each other.

The maximum cost of a path is limited to 15, thus limiting the use of RIP to autonomous systems that are fewer than 15 hops in diameter. In RIP, routing updates are exchanged between neighbors approximately every 30 seconds using a RIP advertisement.

Each router maintains a RIP table known as a routing table. A router's routing table includes both the router's distance vector and the router's forwarding table. The routing table has three columns. The first column is for the destination subnet, the second column indicates the identity of the next router along the shortest path to the destination subnet, and the third column indicates the number of hops to get to the destination subnet along the shortest path. Table 1 shows the routing table for router D. A subnet is a logically visible subdivision of an IP network. The practice of dividing a network into two or more networks is called subnetting. All hosts that belong to a subnet are addressed with a common, identical, most significant bit-group in their IP addresses, which is called the routing prefix.

TABLE 1

Number of Hops from Source Router A to Various Subnets at Router D

| Destination Subnet | Next Router | Number of Hops to Destination |
|---|---|---|
| w | A | 2 |
| y | B | 2 |
| z | B | 7 |
| x | — | 1 |
| ... | ... | ... |

Now suppose that 30 seconds later, router D receives from router A the advertisement shown in Table 2. This advertisement is nothing other than the routing table information from router A. This information, in particular, conveys that subnet z is only four hops away from router A. Router D, upon receiving this advertisement, merges the advertisement with the old routing table. In particular, router D learns that there is now a path through router A to subnet z that is shorter than the path through router B. Thus, router D updates its routing table to account for the newer shortest path, as shown in Table 3.

TABLE 2

Advertisement from Router A

| Destination Subnet | Next Router | Number of Hops to Destination |
|---|---|---|
| z | C | 4 |
| w | — | 1 |
| x | — | 1 |
| ... | ... | ... |

TABLE 3

Routing Table in Router D after Receiving Advertisement from Router A

| Destination Subnet | Next Router | Number of Hops to Destination |
|---|---|---|
| w | A | 2 |
| y | B | 2 |
| z | A | 5 |
| x | — | 1 |
| ... | ... | ... |

Internet Control Message Protocol (ICMP), specified in RFC 792, is used by hosts and routers to communicate network-layer information to each other. ICMP is often considered as part of IP. ICMP message are carried inside IP datagrams. ICMP messages are sent using the basic IP header. The ICMP message format is shown in Table 4. Each ICMP message contains three fields that define its purpose and provide a checksum. They are Type, Code, and Checksum fields. The Type field identifies the ICMP message, the Code field provides further information about the associated Type field, and the Checksum provides a method for determining the integrity of the message. Any field labeled "unused" is reserved for later extensions and must be zero when sent, but receivers should not use these fields (except to include them in the checksum).

TABLE 4

Format of ICMP Message

| Type | Code | Checksum |
|---|---|---|
| Message Body | | |

The type numbers of 42 through 252 are unassigned. In the case of ICMPv6], the type numbers of 159-199 are unassigned.

FIG. 2 is a diagram that illustrates an oneM2M Service Layer called "Common Service Entity (CSE)" 102 as defined by a oneM2M standard under development. The purpose of the Service Layer is to provide "horizontal" services that can be utilized by different 'vertical' M2M silo systems and applications, such as e-Health, fleet management, and smart homes. CSE 102 contains multiple logical functions called "Common Service Functions (CSFs)", such as "Discovery", "Data Management & Repository". FIG. 2 illustrates the CSFs under development at oneM2M.

FIG. 3 is a diagram that illustrates the four reference points as shown in the oneM2M functional architecture that CSE 102 supports. The Mca reference point interfaces with the Application Entity (AE) 302. The Mcc reference point interfaces with another CSE 304 within the same service provider domain and the Mcc' reference point interfaces with another CSE in a different service provider domain. The Mcn reference point interfaces with the underlying network service entity (NSE) 306. An NSE 306 provides underlying network services to the CSEs, such as device management, location services and device triggering.

SUMMARY

A novel naming scheme for IoT devices can address the problem that the existing naming schemes of the IoT devices do not support device discovery and group operation efficiently.

An IoT Device Name Service (IDNS) can be in charge of how the device name is generated from the location and other context information; updated due to the location change or context variation and discovered. Exemplary IDNSs can have the following functionalities:

(1) Sub-location Registration Function: The IDNS can accept the owner/administrator of building/facility in the main location to register the sub-locations.

(2) Sub-location Pool Manager: The IDNS can maintain a sub-location pool, which contains the possible sub-locations under the main location. The sub-locations can be maintained in a hierarchical way, which means that each sub-location may have its own sub-locations, following the tree structure.

(3) Device Registration Function: The IDNS can accept an IoT Device or its administrator/owner to register the device. In the registration information, part of the device's name (e.g. label field), location or other context information may be contained, such that the IDNS is able to record/generate the full device name.

(4) Device Name Generation Function: The IDNS can assign a proper name to an IoT Device based on its location and other context information, e.g. type.

(5) Device Name Update Function: The IDNS can accept an IoT Device or its administrator/owner to update the name of the device due to the device's mobility/location change.

(6) Device Name Pool Manager: The IDNS can maintain the names of IoT devices in the same main location.

(7) Device and Name Discovery Function: The IDNS can accept the device name discovery from an IoT device or device administrator in the same location, or from an IDNS in other locations.

Embodiments of the device name scheme and IDNS can enable new features:

(1) Subnetting: the naming scheme can generate different levels of physical subnetting of the IoT networks.

(2) Name Routing Protocol (NRP): the IoT Devices can be routed by their names. With the name scheme and NRP, the IoT Devices do not need to implement the full protocol stack to enable the direct communication between them.

(3) Device Group Operation: With the proposed IDNS and NRP, a group of IoT Devices can be efficiently discovered and operated on without upper layer involvement.

(4) Locating Device: the proposed name scheme and INDS can help a person to locate/find his devices.

In one embodiment, a name service can maintain names for IoT devices. The name service can be a IDNS. The name service can store the names for the IoT devices with a location field and a label field. The location field including location information can include a major location and a sub-location.

In one embodiment, an Internet of Things (IoT) device is adapted to route messages to a second IoT device. The IoT device can include a routing table that indicates a third IoT device to forward the message to on its way to the IoT device. The routing table can use IoT device names that include a location field including a major location and at least one sub-location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this application.

BRIEF DESCRIPTION OF THE DRAWINGS

A more detailed understanding may be had from the following description, given by way of example in conjunction with accompanying drawings wherein:

FIGS. 37A-B are diagrams of exemplary Graphical User Interfaces.

DETAILED DESCRIPTION OF ILLUSTRATIVE EMBODIMENTS

Embodiments relate to naming devices and schemes for network devices, such as Internet of Things (IoT) devices. IoT devices can include devices connected to the Internet including sensors, mobile devices, medical devices, automobiles, machines and appliances. IoT devices can include devices that can sense, communicate and share information, and are interconnected as well as interacted over public or private networks across Internet. It can be foreseen that many of devices/appliances/machines (such as home appliances, remote sensors/actuators, machines, mobile devices, automobiles, etc.) will be IoT devices once they are equipped with the above-mentioned capabilities. In particular, these IoT devices can have data regularly collected, analyzed and used to initiate actions and provide various services ranging from home automation, intelligent industry control, remote and real-time healthcare, etc.

The existing identifiers of the IoT devices do not natively support device discovery and group operation. In many IoT use cases, it is very common that users want to discover the devices in the same location or with the same context information, e.g. the same type of device. After discovery, the users may also want to do group operations on the devices.

Figure 1:
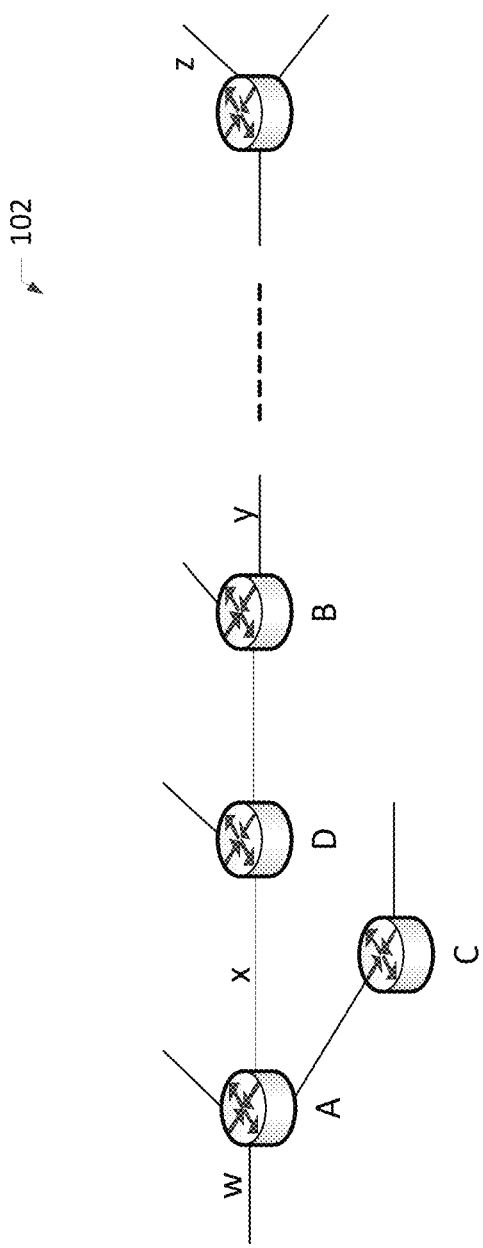
FIG. 1 is a diagram that illustrates a portion of an autonomous system (AS).
Figure 2:
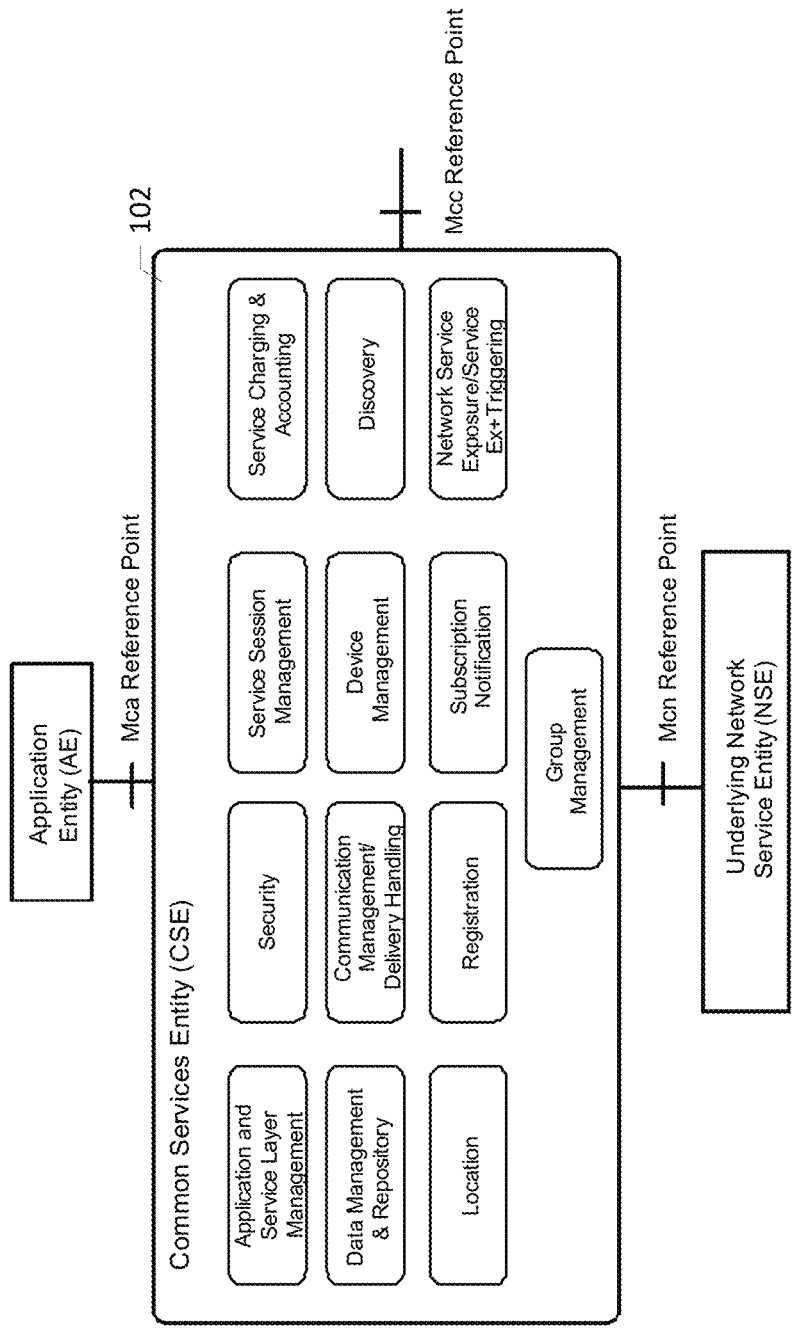
FIG. 2 is a diagram that illustrates a oneM2M Service Layer called "Common Service Entity (CSE)" as defined by a oneM2M standard under development.
Figure 3:
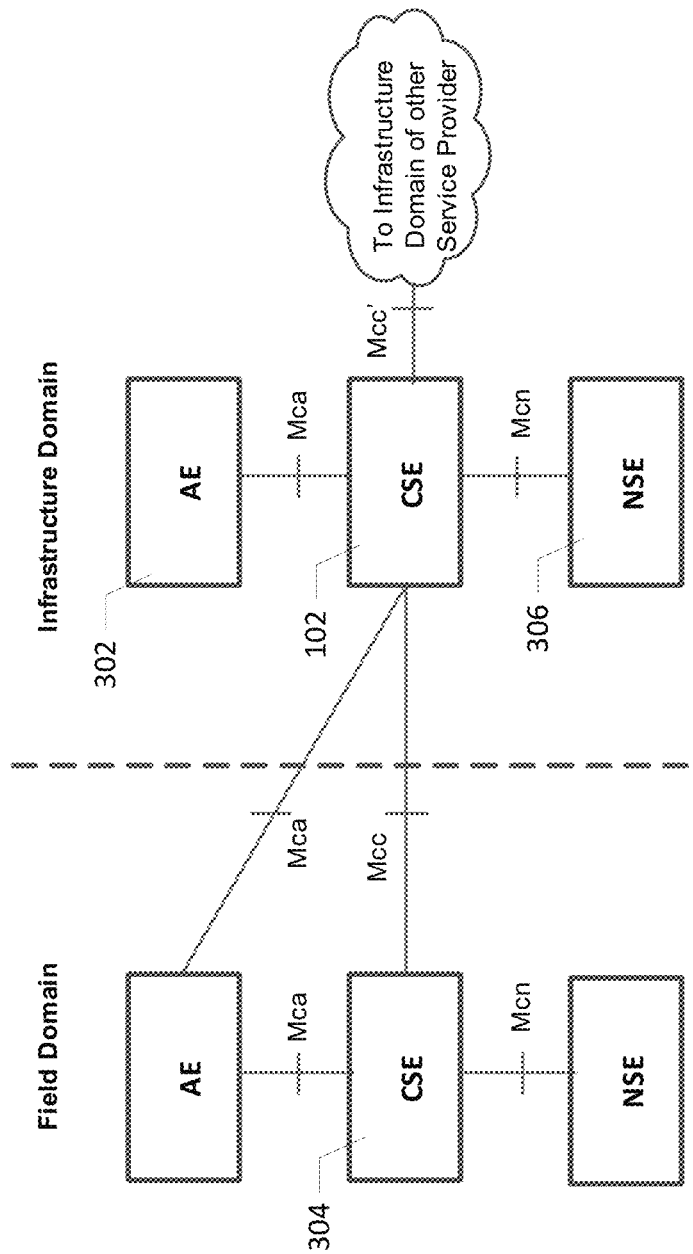
FIG. 3 is a diagram that illustrates the four reference points as shown in the oneM2M functional architecture that CSE supports.
Figure 4:
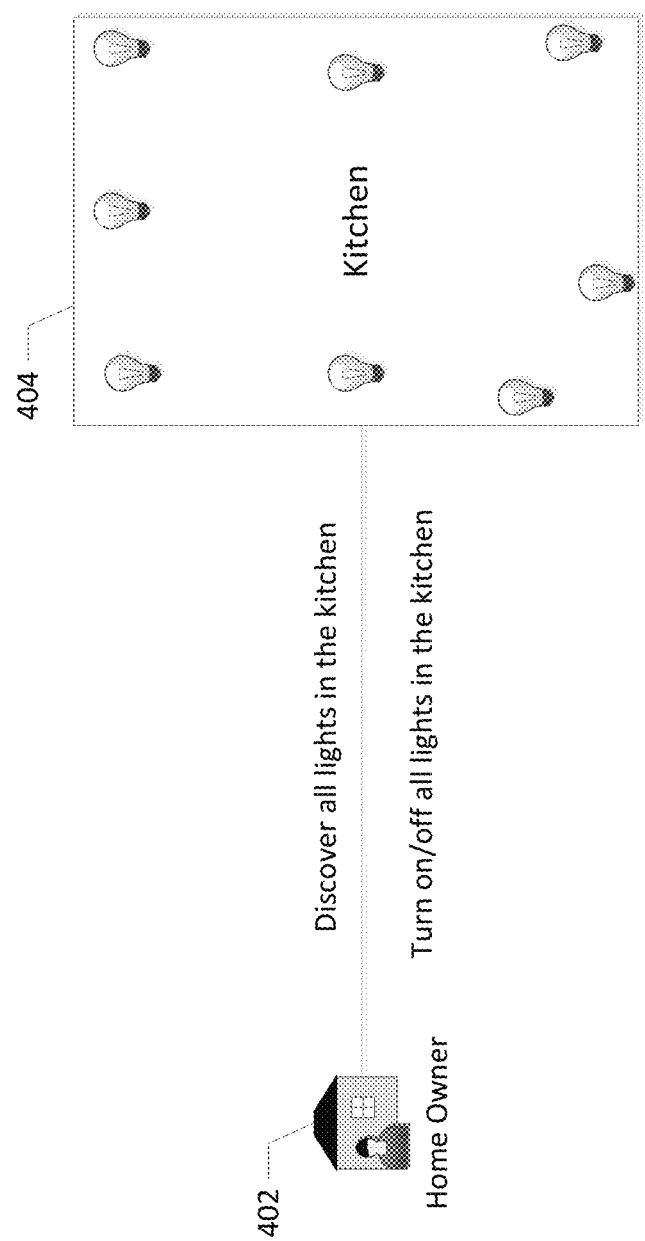
FIG. 4 is a diagram illustrating an example where a home owner wants to discover the list of lights in the kitchen, and turn on/off the group of lights.
Figure 5:
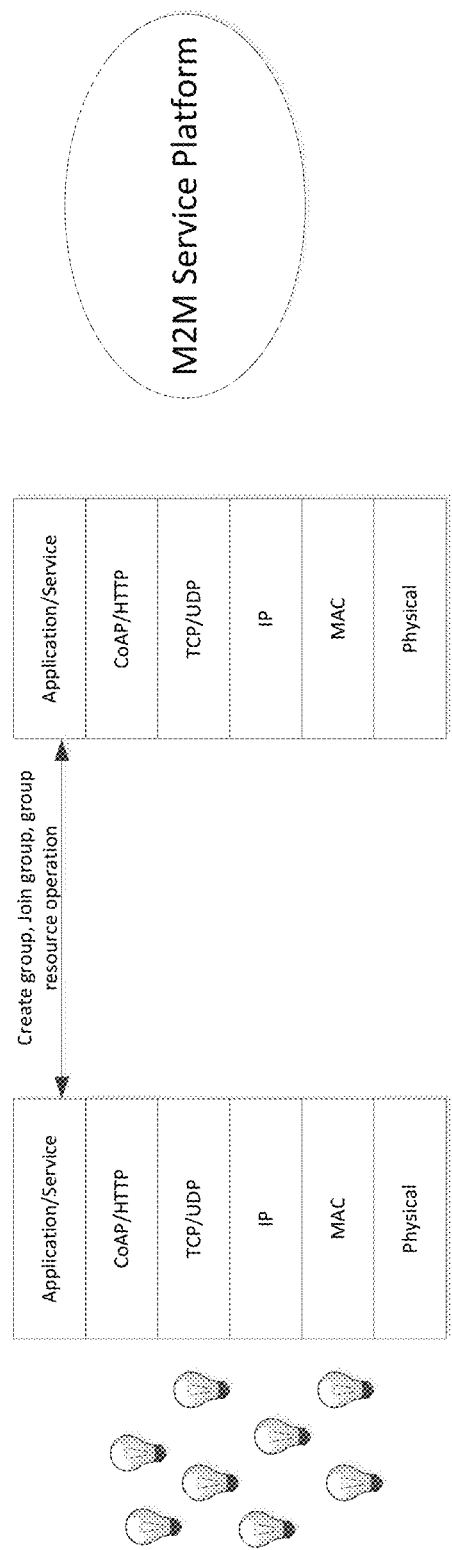
FIG. 5 is a diagram that illustrates a CoRE RD implementation with a group in the Service Layer or Application Layer.

FIG. 4 is a diagram illustrating an example where a home owner wants to discover the list of lights in the kitchen 404, and turn on/off the group of lights. The existing identifiers of IoT devices do not facilitate such advanced device discovery. For example, none of the IoT Device identifiers discussed in the background contain the device location information that could natively support the advanced device discovery based on location or other context information. And the existing support of device discovery and group operations require the involvement of the higher layers, such as CoRE RD implementation, setting up the group in the Service Layer or Application Layer as shown in FIG. 5. However, it is very expensive for resource constrained devices to support such full protocol stack.

In the current IoT system, although the devices which communicate with each other are located in the same subnet, the source device still reports its data to the service layer to store it, the other devices retrieve the data from the service layer. For example, as in the ETSI M2M architecture/oneM2M architecture, the device application on a device sends sensing data or its status to be stored on the resource tree. The device application on another device which is interested in the data will need to subscribe to the resource. Once there is an update on the resource, the other device will get notified. It is very likely that those devices may be located near each other, and may want to talk to each other without the involvement of the service platform, which can reduce the time latency and service cost. In other words, service in proximity is a unique and fundamental interaction paradigm in the M2M/IoT systems. Unfortunately, the existing device naming scheme cannot effectively facilitate such a communication paradigm.

As a result, the current IoT system is lacking of an effective device naming scheme to facilitate M2M/IoT featured applications and operations, such as device discovery, device group operation, direct device communication without involvement of the higher layers (e.g. service layer), etc.

The following describes a novel naming scheme for IoT Devices and uses smart home use case to discuss how the naming scheme applies to indoor IoT Devices. The naming scheme is also applicable to outdoor IoT Devices in use cases, such as industry field control, etc. Secondly, with the proposed naming scheme, an exemplary IoT Device Name Service (IDNS), is described which can be in charge of how the device name is generated from the location and other context information; updated due to the location change or context variation and discovered. Thirdly, a number of new features are described that can be enabled by the naming scheme and IDNS. Last, an ICMP message embodiment of the major control messages and the oneM2M embodiment of the proposed IDNS are discussed.

An exemplary naming scheme for IoT devices is shown in Table 5. One primary attribute of a device is its location, which is included as one part of the device name. With the location attribute included in the device name, the device is locatable from its name. The devices with the same location can be easily grouped together for the purpose of data aggregation, device management, device routing etc. The exemplary IoT Device name has two major fields:

The location field that is contained in the name of an IoT Device is considered to be the major property to identify and address an IoT Device. An IoT Device's location may consist of a major location (which could be a civil location, coordinates or geohash), and sub-location (where the device is deployed within the major location).

There could be many devices located in the same location, thus a label field can be appended to the location to uniquely identify a device. The label could incorporate some important semantics/context information of the device, such as the type of the device. The label field does not need global uniqueness. However, within the same location, it needs local uniqueness. The IDNS can make sure the local uniqueness of the label field within the same sub-location.

TABLE 5

Naming Scheme of IoT Devices

| Location | Label |
| --- | --- |

This naming scheme can:
facilitate device discovery, e.g. find all lights on the first floor of the house.
facilitate device aggregation and group operation, e.g. turn off all lights in the house.

Figure 8:
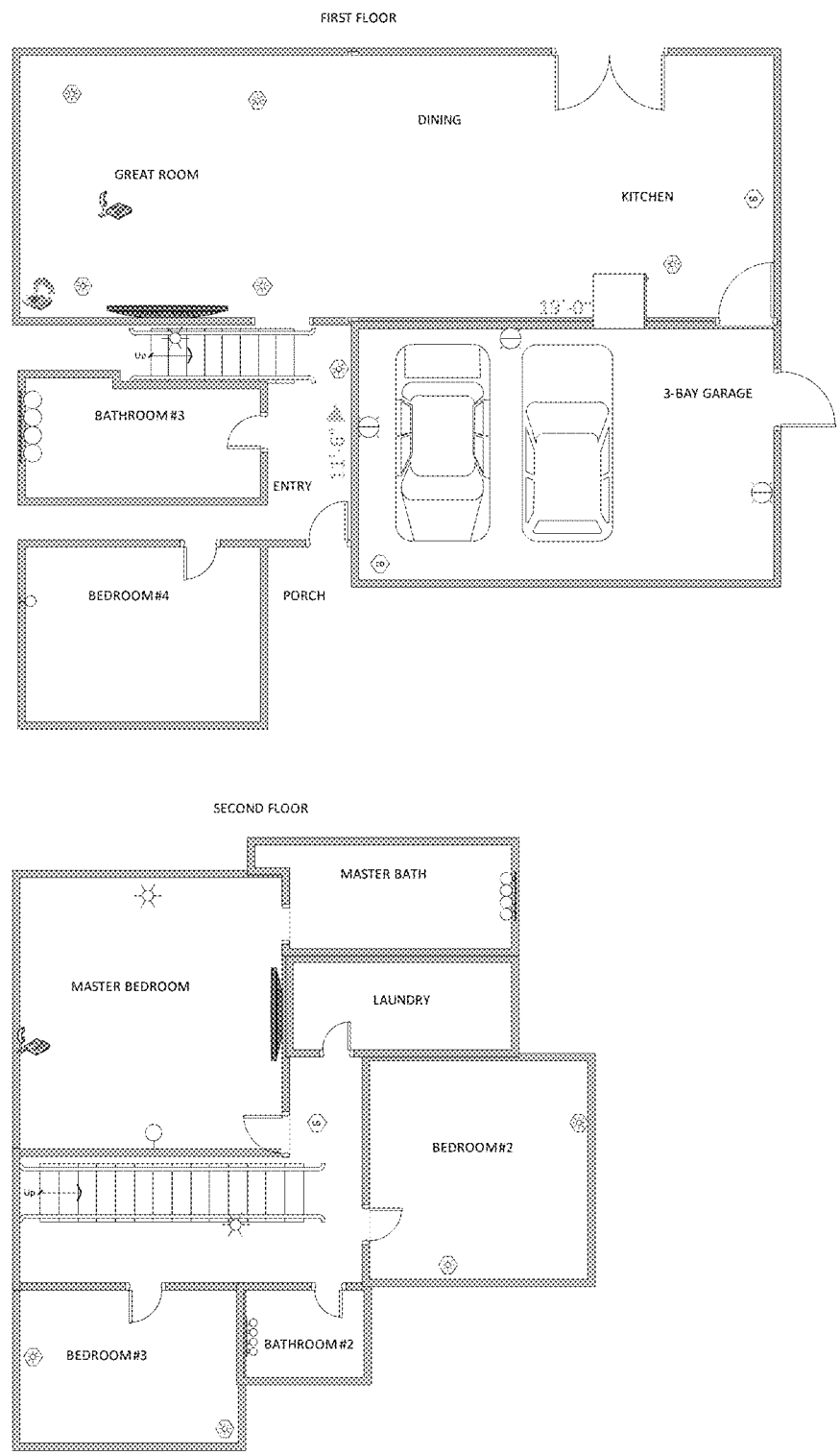
FIG. 8 is a diagram that illustrates a floor plan of a house and devices located in the house, such as fridge, smoke sensor, light in the kitchen, lights and phone in the great room, doorbell at the entry.

The example below deals with indoor IoT devices that are deployed for applications, such as smart home, smart hospital. Those indoor devices are located in specific rooms in a building. FIG. 8 is a diagram that illustrates a floor plan of a house and devices located in the house, such as fridge, smoke sensor, light in the kitchen, lights and phone in the great room, doorbell at the entry.

A device's location in the house can have several hierarchies. In the following example, the first hierarchy indicates the location of the house; the second hierarchy indicates the floor; the third hierarchy indicates the room; and the devices in each room have a unique label. As a result, the devices in the house could have the following names, as examples:

addressofJohnHome.F1.Bathroom3.Light1
addressofJohnHome.F1.Bedroom4.Light1
addressofJohnHome.F1.Entry.doorbell
addressofJohnHome.F1.Entry.Light
addressofJohnHome.F1.Kitchen.Fridge
addressofJohnHome.F1.Kitchen.Light1
addressofJohnHome.F1.Kitchen.Light2
addressofJohnHome.F1.Great.Gateway
addressofJohnHome.F1.Great.Phone
addressofJohnHome.F1.Great.Light1
addressofJohnHome.F1.Great.TV
addressofJohnHome.F1.Garage.Car1
addressofJohnHome.F1.Garage.Car2
addressofJohnHome.F1.Garage.Light1
addressofJohnHome.F2.Masterbedroom.Phone
addressofJohnHome.F2.Masterbedroom.TV
addressofJohnHome.F2.Hallway.Gateway Dots are used to concatenate the different hierarchies; other symbols can be used as well.

Figure 38A:
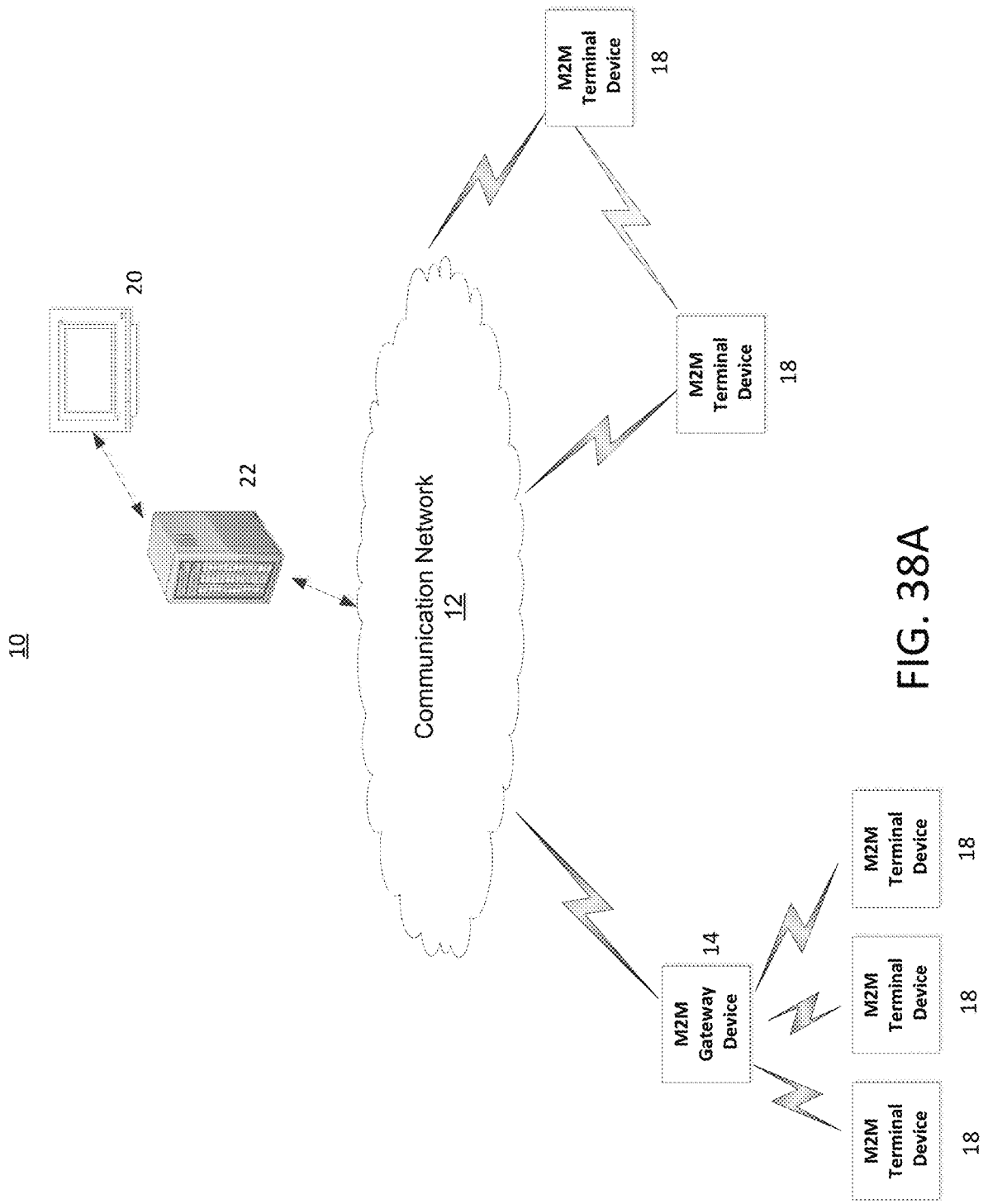
FIG. 38A is a diagram of an example machine-to machine (M2M), Internet of Things (IoT), or Web of Things (WoT) communication system in which one or more disclosed embodiments may be implemented.
Figure 38B:
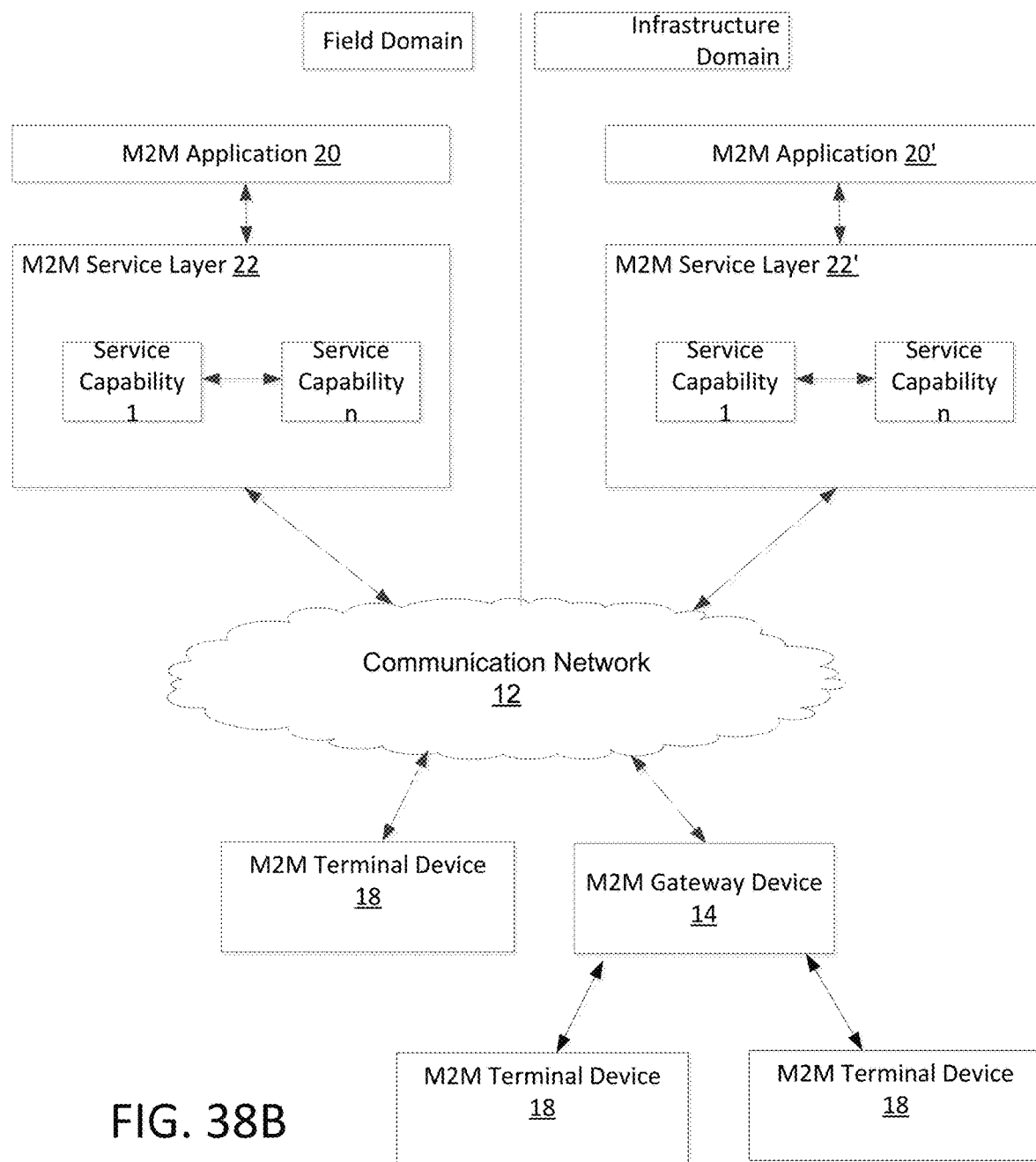
FIG. 38B is a system diagram of an example architecture that may be used within the M2M/IoT communications system illustrated in FIG. 38A.
Figure 38C:
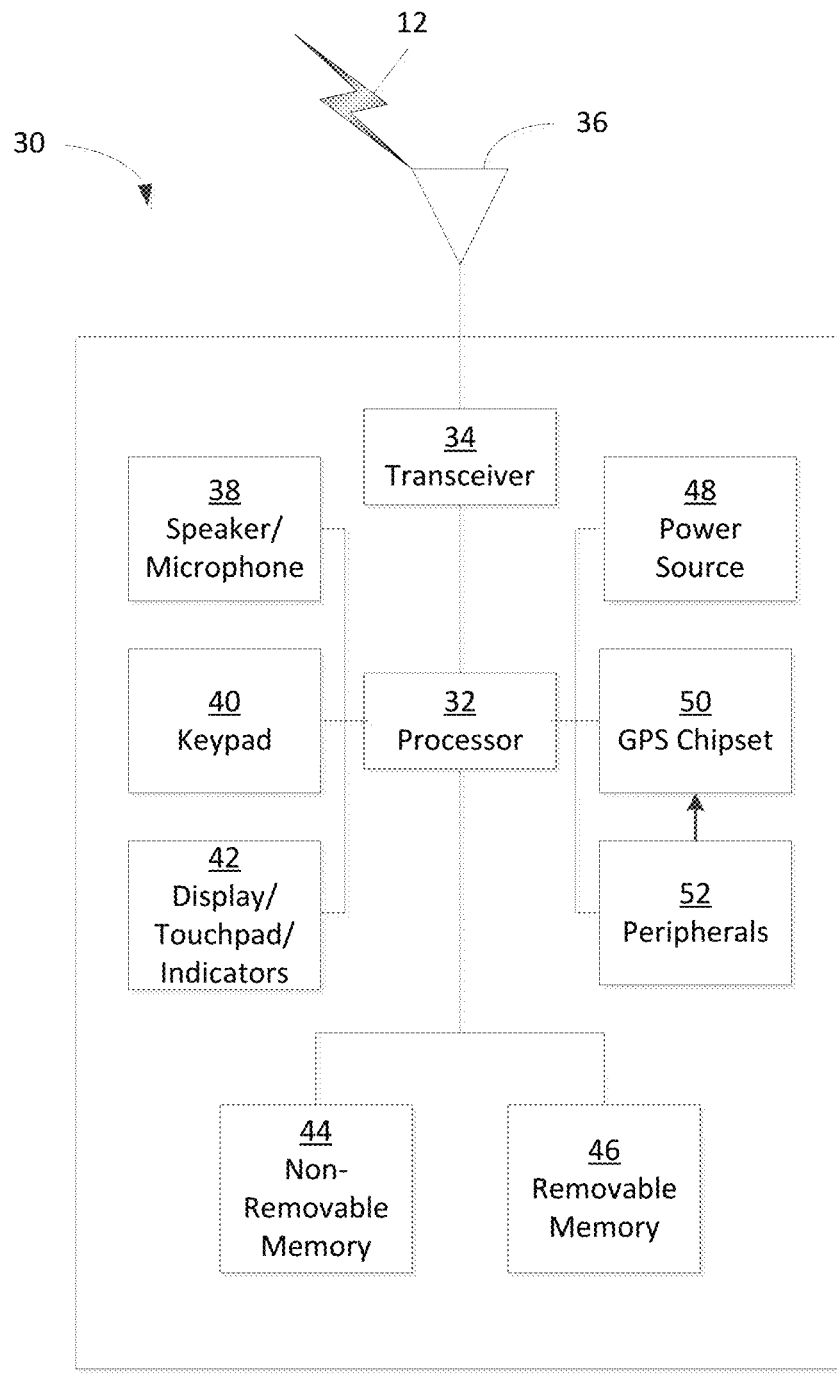
FIG. 38C is a system diagram of an example M2M/IoT terminal or gateway device that may be used within the communications system illustrated in FIG. 38A.
Figure 38D:
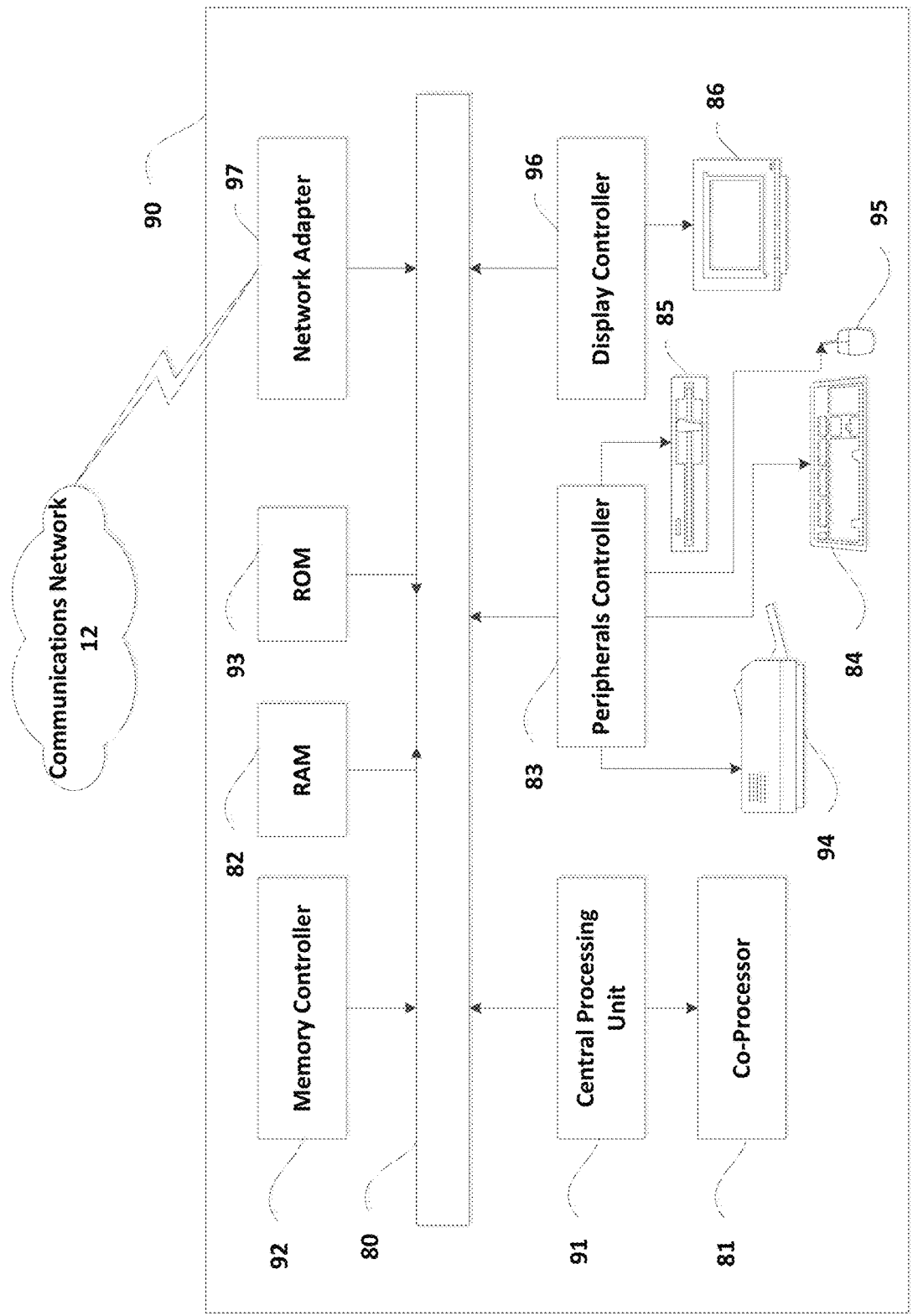
FIG. 38D is a block diagram of an example computing system in which aspects of the communication system of FIG. 38A may be embodied.

In order to reduce the length of the address, it is possible to limit the number of characters in the name of each hierarchy. The first hierarchy needs to comparatively have more characters than others to be unique, since it is the highest hierarchy for subnetting and there are comparably more subnets in the first hierarchy. For example, the above identifiers may appear as the following to reduce the size of the messages transported between the devices:

addressofJohnHome.F1.B3.Lt1
addressofJohnHome.F1.B4.Lt1
addressofJohnHome.F1.E.Db
addressofJohnHome.F1.E.L
addressofJohnHome.F1.K.Fg addressofJohnHome.F1.K.L1
addressofJohnHome.F1.K.L1
addressofJohnHome.F1.Gt.Gw
addressofJohnHome.F1.Gt.Ph
addressofJohnHome.F1.Gt.L1
addressofJohnHome.F1.Gt.TV
addressofJohnHome.F1.Gg.C1
addressofJohnHome.F1.Gg.C2
addressofJohnHome.F1.Gg.L1
addressofJohnHome.F2.MB.Ph
addressofJohnHome.F2.MB.TV
addressofJohnHome.F2.HW.Gw It is understood that the functionality illustrated in FIG. 8 may be implemented in the form of software (i.e., computer-executable instructions) stored in a memory of, and executing on a processor of, a node of an M2M network (e.g., a server, gateway, device, or other computer system), such as one of those illustrated in FIG. 38C or 38D described below.

Figure 9:
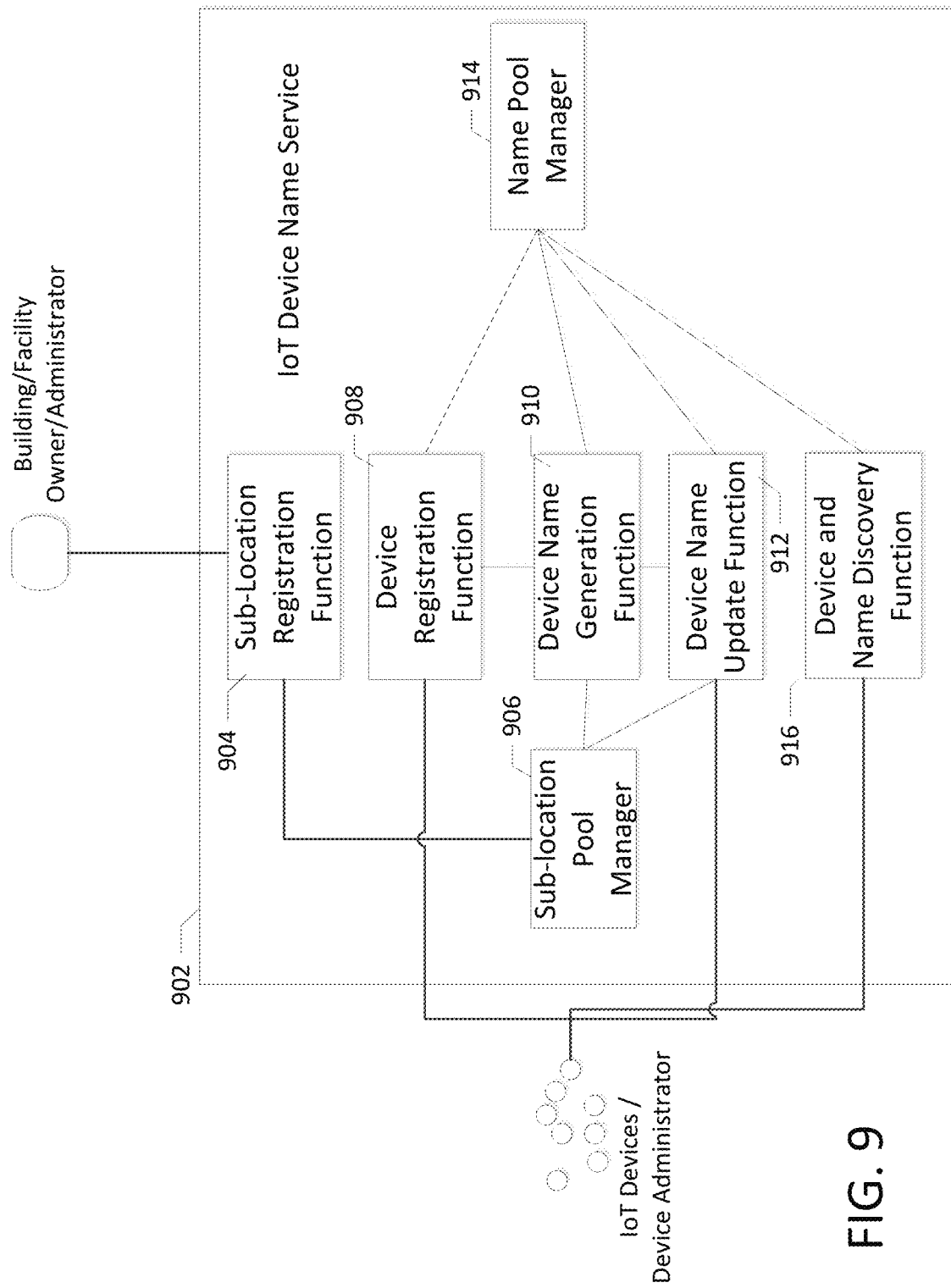
FIG. 9 is a diagram of an exemplary IOT Device Name Service (IDNS).

FIG. 9 is a diagram of an exemplary IOT Device Name Service (IDNS) 902. An IoT Device Name Service (IDNS) 902 can be in charge of how the device name is generated from the location and other context information, updated due to location change or context variation, and discovered. In one embodiment, the IDNS 902 has the following functionalities:

1) Sub-location Registration Function 904: the IDNS 902 can accept the owner/administrator of building/facility in the main location (later we refer as building and building administrator) to register the sub-locations. For example, for the house shown in FIG. 8, the main location is the address of the house, while the sub-locations could be different floors, rooms in the house, e.g. first floor, second floor, house entry, kitchen, dining room, master room.

2) Sub-location Pool Manager 906: the IDNS 902 can maintain a sub-location pool, which contains the possible sub-locations under the main location. The sub-locations can be maintained in a hierarchical way, which means that each sub-location may have its own sub-locations, following a tree structure.

3) Device Registration Function 908: the IDNS 902 can accept an IoT Device or its administrator/owner to register the device. In the registration request, part of the device's name (e.g. label field), location or other context information may be contained, such that the IDNS 902 is able to record/generate the device name.

4) Device Name Generation Function 910: the IDNS 902 can assign a proper name to an IoT Device based on its location and other context information, e.g. type.

5) Device Name Update Function 912: the IDNS 902 can accept an IoT Device or its administrator/owner to update the name of the device due to the device's mobility/location change.

6) Device Name Pool Manager 914: the IDNS 902 can maintain the names of IoT devices in the same main location.

7) Device and Name Discovery Function 916: the IDNS 902 can accept the device and its name discovery from an IoT device or device administrator in the same location, or from an IDNS 902 in other locations.

The IDNS 902 can be hosted in the main gateway within the building, such that every device in the same location is able to access the IDNS 902, while IDNS 902 in other locations can also interact with each other. All the control messages between a device and its IDNS 902 (intra-domain communication) can be routed by IP, as well as the proposed name, which is a significant feature enabled by the proposed name scheme.

Figure 6:
FIG. 6 is a diagram that shows an IDSN as a thin layer over IP.
Figure 7:
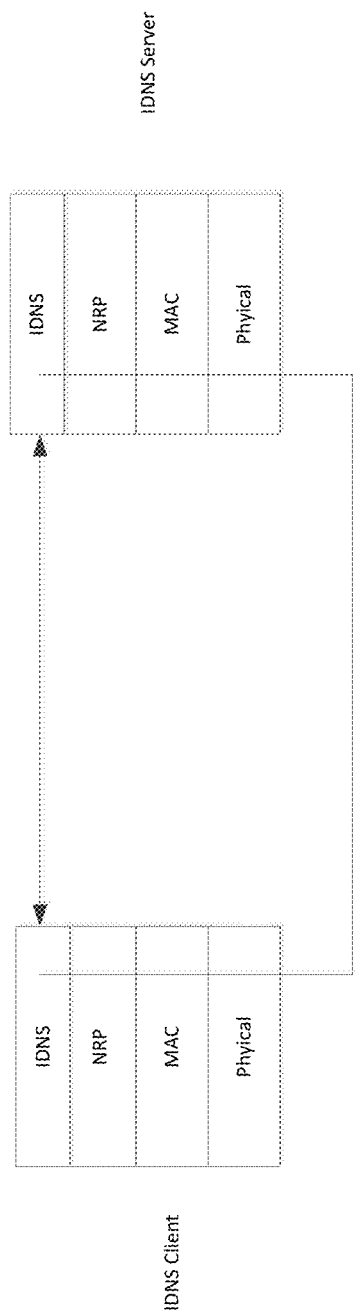
FIG. 7 is a diagram that shows an IDSN as a thin layer over a Name Routing Protocol (NRP).

The proposed IDNS 902 an be a thin layer on top of IP or NRP (Name Routing Protocol discussed below) as shown in FIG. 6 and FIG. 7. If both IDNS client and server are assigned with IP addresses, the communication between the IDNS client and server can be routed by IP. The disclosure provides the ICMP message embodiment of the major control messages proposed in this disclosure. On the other hand, if the IDNS client is aware of the IDNS server name (by provisioning), the communication between the IDNS client and server can be routed by NRP proposed in the disclosure.

The IDSN 902 can support a Sub-location Registration Function 904. In one example, if the building administrator needs to notify the IDNS 902 about the sub-locations inside the building. Here, we assume that the building administrator has the knowledge of all the sub-locations within this building. The building administrator can choose to only report those sub-locations that contain IoT Devices instead of all of them, if the building administrator is aware of such information (the building administrator could be the device administrator as well). Since the sub-locations have hierarchies, e.g. floor, room. The building administrator can report the sub-locations in a layered way, i.e. layer by layer. For example, in the example in FIG. 8, the building administrator reports the first layer of floor numbers, then sub-locations on each floor.

It is understood that the functionality illustrated in FIG. 9 may be implemented in the form of software (i.e., computer-executable instructions) stored in a memory of, and executing on a processor of, a node of an M2M network (e.g., a server, gateway, device, or other computer system), such as one of those illustrated in FIG. 38C or 38D described below.

Figures 10, 11:
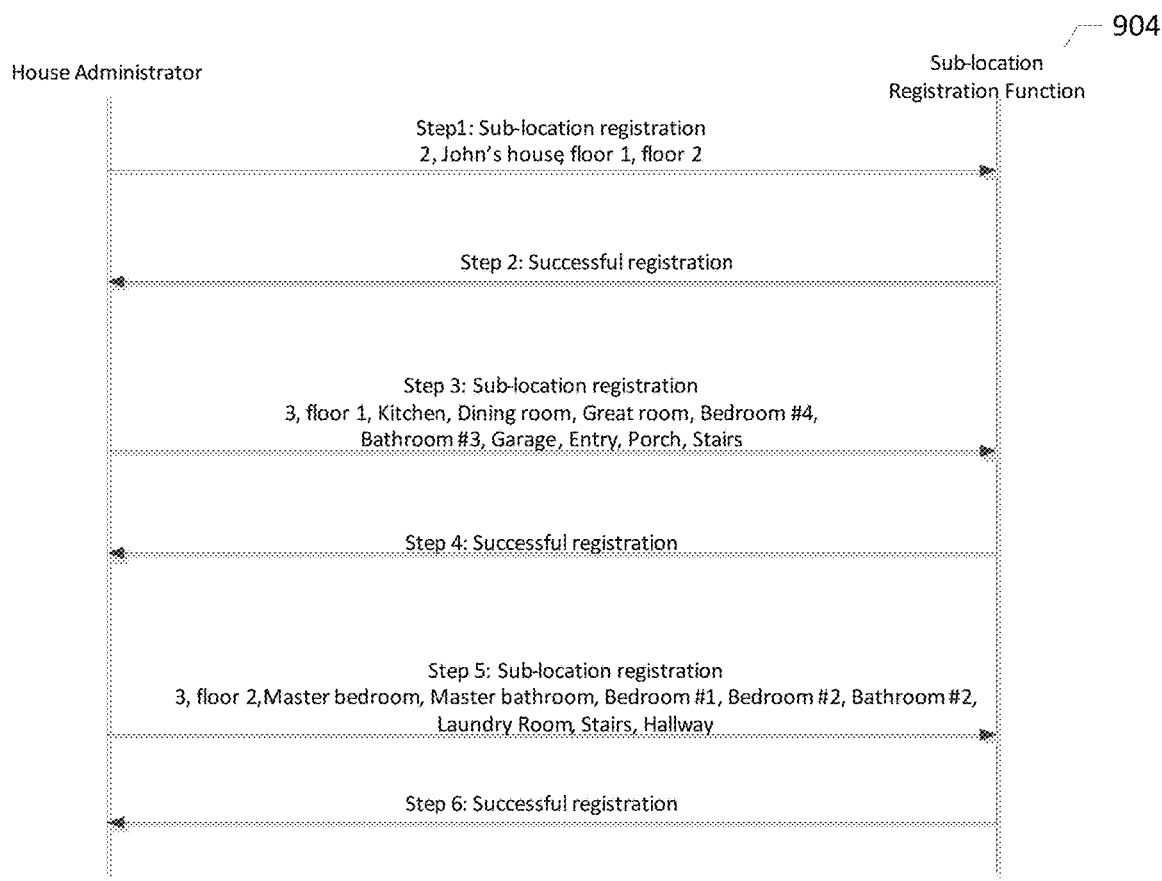
FIG. 10 is a diagram that illustrates the message format for sub-location registration of one embodiment.
FIG. 11 is a diagram that illustrates a detailed message flow and messages for the sub-location registration.

FIG. 10 is a diagram that illustrates a message format for sub-location registration of one embodiment:

The layer number indicates which layer the sub-location is, for example, the floor has the layer number of 2 and the rooms have the layer number of 3.

The upper layer node shows what the node above the current layer for this layer is. For example, the floor layer (layer 2)'s upper layer node is the house, the room layer (layer 3)'s upper layer node can be one of the floors in layer 2. Thus each layer may contain more than one branch. The locations form into a hierarchical tree.

The node fields show what the sub-locations are contained in that branch, whose dimensions and coordinates can be included in the registration message as well.

From the all the sub-location registration messages, the IDNS is able to get acknowledge of the floor plan and the dimension of each sub-location in the building.

FIG. 11 is a diagram that illustrates a detailed message flow and messages for the sub-location registration in the example.

In step 1 of FIG. 11, the house administrator sends sub-location registration message to the Sub-location Registration Function 904 in the IDNS 902, with layer number to be 2, and the upper layer node to be the house address, the two nodes in this layer 2: floor 1 and floor 2.

In step 2 of FIG. 11, the Sub-location Registration Function 904 returns the successful registration response to the house administrator, to which the sub-location identifier(s) may be attached.

In step 3 of FIG. 11, the house administrator sends sub-location registration message to the Sub-location Registration Function 904 in the IDNS 902, with layer number to be 3, and the upper layer node to be the floor 1, and all the nodes (rooms) on the floor 1.

In step 4 of FIG. 11, the Sub-location Registration Function 904 returns the successful registration response to the house administrator, to which the sub-location identifier(s) may be attached.

In step 5 of FIG. 11, the house administrator sends sub-location registration message to the Sub-location Registration Function 904 in the IDNS 902, with layer number to be 3, and the upper layer node to be the floor 2, and all the nodes (rooms) on the floor 2.

In step 6 of FIG. 11, the Sub-location Registration Function 904 returns the successful registration response to the house administrator, to which the sub-location identifier(s) may be attached.

The sub-location registration function 904 can also support any further update of the sub-locations from the building administrator, for example, a new room can be added or deleted due to the structural change. Another reason that could trigger the sub-location update is that a room changes from containing no IoT Devices to be deployed with IoT Devices, or vice versa. Note, if a sub-location in a higher layer is removed by the building administrator, all the sub-locations under that layer can be removed as well.

It is understood that the entities performing the steps illustrated in FIG. 11 are logical entities that may be implemented in the form of software (i.e., computer-executable instructions) stored in a memory of, and executing on a processor of, a network node or computer system such as those illustrated in FIG. 38C or FIG. 38D. That is, the method(s) illustrated in FIG. 11 may be implemented in the form of software (i.e., computer-executable instructions) stored in a memory of a network node, such as the node or computer system illustrated in FIG. 38C or FIG. 38D, which computer executable instructions, when executed by a processor of the node, perform the steps illustrated in FIG. 11. It is also understood that any transmitting and receiving steps illustrated in FIG. 11 may be performed by communication circuitry of the node under control of the processor of the node and the computer-executable instructions (e.g., software) that it executes.

Figure 12:
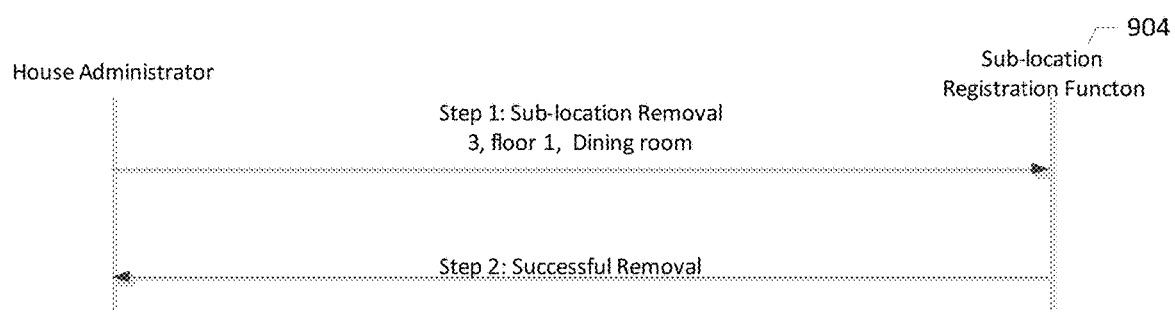
FIG. 12 is a message flow diagram that illustrates a message flow for a house administrator to request the IDNS to remove the sub-location dining room.

FIG. 12 is a message flow diagram that illustrates the message flow for a house administrator to request the IDNS 902 to remove the sub-location dining room.

In step 1 of FIG. 12, the house administrator sends the sub-location removal request to the Sub-location Registration Function 904 in the IDNS 902, with the layer number to be 3, upper layer node to be floor 1, and the node to be dining room.

In step 2 of FIG. 12, the Sub-location Registration Function 904 returns the successful removal response.

It is understood that the entities performing the steps illustrated in FIG. 12 are logical entities that may be implemented in the form of software (i.e., computer-executable instructions) stored in a memory of, and executing on a processor of, a network node or computer system such as those illustrated in FIG. 38C or FIG. 38D. That is, the method(s) illustrated in FIG. 12 may be implemented in the form of software (i.e., computer-executable instructions) stored in a memory of a network node, such as the node or computer system illustrated in FIG. 38C or FIG. 38D, which computer executable instructions, when executed by a processor of the node, perform the steps illustrated in FIG. 12. It is also understood that any transmitting and receiving steps illustrated in FIG. 12 may be performed by communication circuitry of the node under control of the processor of the node and the computer-executable instructions (e.g., software) that it executes.

Figure 13:
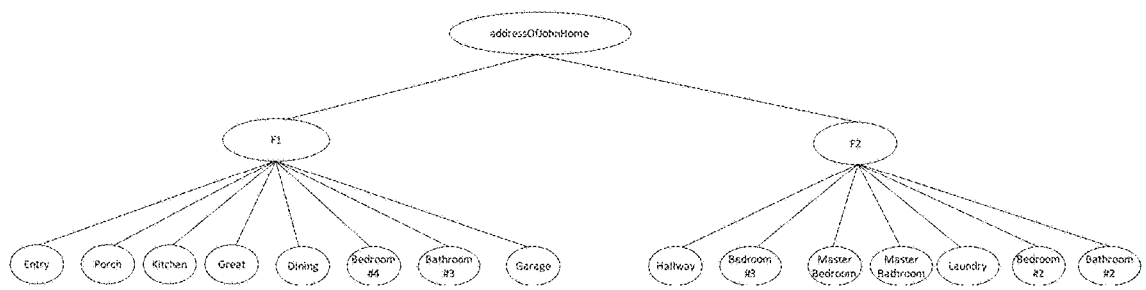
FIG. 13 is a diagram that illustrates a location tree of one embodiment.

A sub-location pool manager 906 can maintain the sub-locations that are registered by the building administrator. It can record all sub-locations included in each of the layers, e.g., first floor in the second layer, kitchen in the third layer. In other words, each sub-location can correspond to a node in the location tree as shown in FIG. 13. The sub-location pool manager 906 can record a sub-location with the fields are shown in Table 6. The Description field can be extracted from the sub-location registration message from the building administrator, which shows how the building administrator describes the sub-location. The Identifier field can be generated by the IDNS 902, which could have more than one value. For example, the sub-location Bedroom #4 can have two identifiers: Bedroom4 (long version) and B4 (short version). In one embodiment, the identifier of the sub-location can be able to uniquely identify it under the same parent node. In other words, it need not prevent that the children nodes under different parent nodes use the same identifier. The IDNS 102 can try to avoid this situation when generating the identifiers of the sub-locations when they are registered. The Identifier field can be used to generate device name by the Name Generation Function 910.

TABLE 6

Sub-Location Pool Record

| Identifier | Description | Parent Identifier | Number of Children | Children identifier |
|---|---|---|---|---|
| addressofJohnHome | John's house | N/A | 2 | F1, F2 |
| F1 | floor 1 | addressofJohnHome | 8 | Kitchen, Great, Bedroom4, Bathroom3, Garage, Entry, Porch, Stairs |
| F2 | floor 2 | addressofJohnHome | 7 | Masterbedroom, Master Bathroom, Bedroom1, Bedroom2, Bathroom2, Laundry, Stairs, Hallway |
| Bedroom4, B4 | Bedroom #4 | F1 | 0 | N/A |
| Kitchen, K | Kitchen | F1 | 0 | N/A |
| . . . | . . . | . . . | . . . | . . . |
| . . . | . . . | . . . | . . . | . . . |
| Masterbedroom, MB | Master Bedroom | F2 | 0 | N/A |
| Hallway, H | Hallway | F2 | 0 | N/A |
| . . . | . . . | . . . | . . . | . . . |

Figure 14:
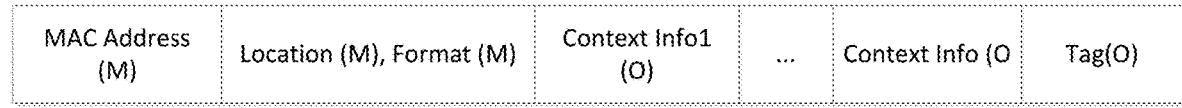
FIG. 14 is a diagram that illustrates sending a device registration message to the IDNS.

The IDNS 902 can have a Device Registration Function 908. The IoT Devices placed in the building can be registered to the IDNS (the IDNS server's IP address or name is provisioned to the IoT Devices in the same location), which is handled by the Device Registration Function 908. The IoT Device itself or IoT Device administrator sends the device registration message to the IDNS 902 as shown in FIG. 14. The device registration message may contain different combination of information. Each of the field can be labeled as optional or mandatory. The Medium Access Control (MAC) address field can be mandatory. The MAC address is a unique address of the device after manufacture. The location field can be mandatory as well. The location which is required by the Name Generation Function 910 to generate the device name based on the name scheme The location field may be assigned with value in different formats.

Location description (D), e.g. bedroom #4 as shown in the description field in Table 6. Based on the description, the Name Generation Function 910 will query the Sub-location Pool Manager 906 to find out the proper sub-location identifier, which will be included in the device name. Note, the description included in the Location field need not be exactly the same as the description field in Table 6, The Sub-location Pool Manager 906 is able to support the fuzzy query, and finds the closest match.

Location identifier (I), e.g. Bedroom4 as shown in the identifier field in Table 6. The device or the device administrator may know the sub-location identifier in the following situations: The device or device administrator may query the Sub-location Pool Function for the proper sub-location identifier before the registration, such that it can input in the registration message with (I) format. The device administrator may be the same entity as the building administrator, which has the knowledge of the sub-location identifiers in the building.

The Name Generation Function 910 can verify the identifier with the Sub-location Pool Manager 906 if it is a valid location identifier. And the Name Generation Function 910 can use it to generate the device name.

Location coordinates (C), e.g. a combination of coordinates in 3D (x, y, z) may be obtained by the device itself automatically by the existing indoor positioning system (IPS) technologies, such as time of arrival (ToA), received signal strength indication etc. Based on the coordinates, the Name Generation Function 910 will query the Sub-location Pool Manager 906 to find out the proper sub-location identifier. The Sub-location Pool Manager 906 has the knowledge of the building's floor plan and the dimension of each sub-location, as a result, it can determine the sub-location where the device is in and return the sub-location identifier to the Name Generation Function 910.

The format of the location value can also be included in the device registration message as shown in FIG. 14.

The IoT Device or the device administrator can also include some of the context information of the device in the registration message, e.g. the type of the device, the sleep schedule of the device etc. The Name Generation Function 910 will select from them and incorporate into the Label field of the device name. The Tag field can contain the value that the device itself or the device administrator wants to include in the Label field of the device name, for example, some letters that are special to the device administrator.

The Device Registration Function 908 can communicate with the Device Name Generation Function 910 to obtain a globally unique name for the device. If such name is generated, the Device Registration Function 908 can reply to the device or the device administrator with a successful registration response.

The Device Name Generation Function 910 can generate a globally unique name for an IoT Device in the domain that the IDNS 902 is in charge of. In the example, the Device Name Generation Function 910 is responsible for generating names for all the registered devices in the building. The Device Registration Function 908 forward the device registration information to the Device Name Generation Function 910.

Figure 15:
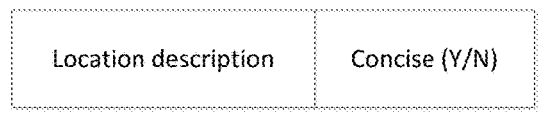
FIG. 15 is a diagram that illustrates an example of the sub-location identifier query message format.

If the location field has the format of (D) (description), the Device Name Generation Function 910 can query the Sub-location Pool Manager 906 for the corresponding location identifier which matches the description. FIG. 15 is a diagram that illustrates an example of the sub-location identifier query message format. The location description can be copied from the device registration message. The concise field can indicate whether the Device Name Generation Function 910 wants a concise/short version of the identifier if it exists.

If the Sub-location Pool Manager 906 finds a matching sub-location, it can return the sub-location identifier to the Device Name Generation Function 910. The Device Name Generation Function 910 incorporate the sub-location identifier and other context information/tag that are optionally contained in the registration message into the name of the device. After the name is generated, it can be returned to the Device Registration Function 908, which accordingly returns a successful registration response to the originator. The generated device name can be recorded and maintained by the Device Name Pool Manager 914. Later if the device stays in the same location, it does not need to go through the device registration process to obtain the name even though it may disconnect due to lack of battery etc. It can use the same name afterwards in the same location, unless some of the context information contained in the initial registration message changes.

Figure 16:
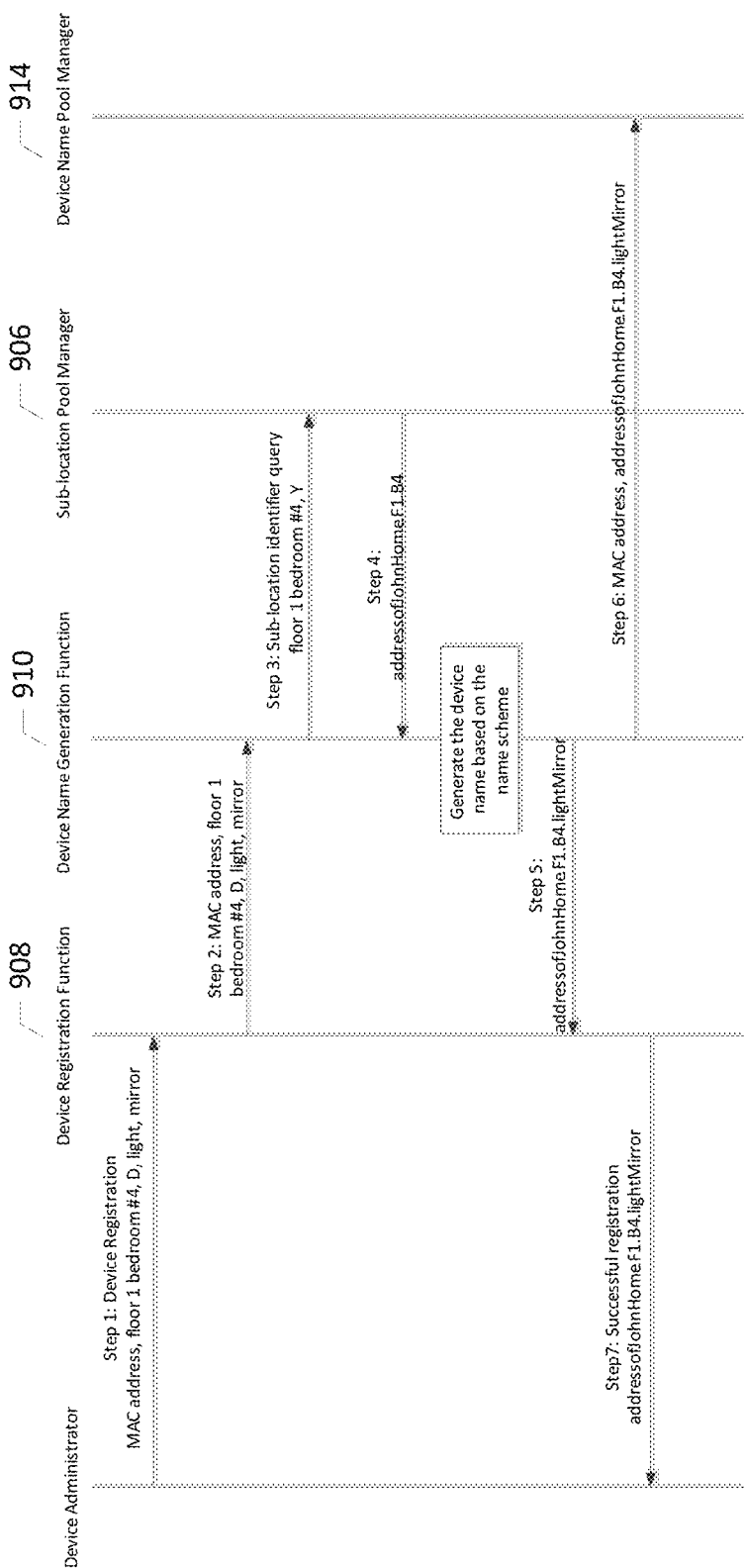
FIG. 16 is a message flow diagram for IOT device registration in one exemplary embodiment.

FIG. 16 is a message flow diagram for IOT device registration in one exemplary embodiment.

In step 1 of FIG. 16, the device administrator sends device registration message to the Device Registration Function 908.

In step 2 of FIG. 16, the Device Registration Function 908 forwards the main body of the registration message to the Device Name Generation Function 910.

In step 3 of FIG. 16, in the registration message, the location is represented with description. The Device Name Generation Function 910 sends the sub-location identifier query to the Sub-location Pool Manager 906.

In step 4 of FIG. 16, the Sub-location Pool Manager 906 finds a matching entry and returns the corresponding sub-location identifier.

In step 5 of FIG. 16, the Device Name Generation Function 910 generates the device name based on the proposed name scheme and returns to the Device Registration Function 908.

In step 6 of FIG. 16, the Device Name Generation Function 910 also reports the new device and its name to the Device Name Pool Manager 914.

In step 7 of FIG. 16, the Device Registration Function 908 responds the device administrator with a successful registration response, to which the device name is attached.

It is understood that the entities performing the steps illustrated in FIG. 16 are logical entities that may be implemented in the form of software (i.e., computer-executable instructions) stored in a memory of, and executing on a processor of, a network node or computer system such as those illustrated in FIG. 38C or FIG. 38D. That is, the method(s) illustrated in FIG. 16 may be implemented in the form of software (i.e., computer-executable instructions) stored in a memory of a network node, such as the node or computer system illustrated in FIG. 38C or FIG. 38D, which computer executable instructions, when executed by a processor of the node, perform the steps illustrated in FIG. 16. It is also understood that any transmitting and receiving steps illustrated in FIG. 16 may be performed by communication circuitry of the node under control of the processor of the node and the computer-executable instructions (e.g., software) that it executes.

It is possible that there is no such location stored in the sub-location pool which matches the description. Then the device registration cam fail and a failure response with error code (wrong location) can be returned to the device registration originator.

Figure 17:
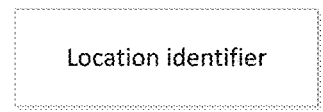
FIG. 17 is a diagram of an exemplary sub-location identifier validation message format.

If the location field has the format of (I) (identifier) (the Device Administrator queried the Sub-location Pool Manager 906 before the device registration), the Device Name Generation Function 910 needs to validate the identifier with the Sub-location Pool Manager 906. FIG. 17 is a diagram of an exemplary sub-location identifier validation message format. The sub-location identifier validation message only needs to contain the identifier that will be validated.

If the sub-location identifier is valid and confirmed by the Sub-location Pool Manager 906, the Device Name Generation Function 910 incorporates the sub-location identifier and other context information/tag that are optionally contained in the registration message into the name of the device. After the name is generated, it is returned to the Device Registration Function 908, which accordingly returns a successful registration response to the originator. The generated device name will be recorded and maintained by the Device Name Pool Manager 914. Later if the device stays in the same location, it does not need to go through the device registration process to obtain the name even though it may die due to lack of battery etc. It will use the same name afterwards in the same location, unless some of the context information contained in the initial registration message changes.

Figure 18:
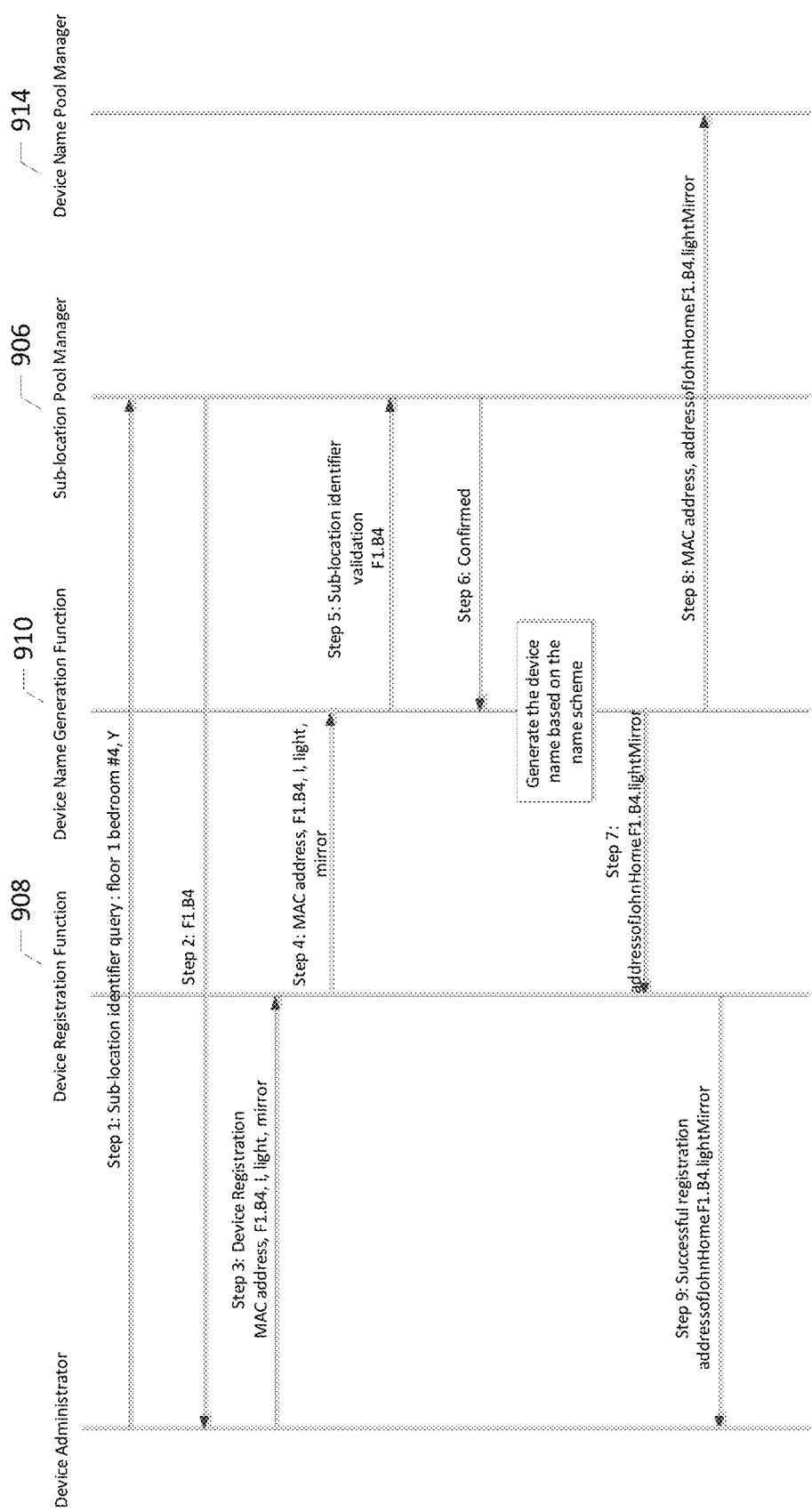
FIG. 18 is a message flow diagram for IOT device name generation in an exemplary embodiment.

FIG. 18 is a message flow diagram for IOT device name generation in an exemplary embodiment.

In step 1 of FIG. 18, the device administrator sends the sub-location identifier query to the Sub-location Pool Manager 906.

In step 2 of FIG. 18, the Sub-location Pool Manager 906 finds a matching entry and returns the corresponding sub-location identifier.

In step 3 of FIG. 18, the device administrator sends device registration message to the Device Registration Function 908 with the proper sub-location identifier.

In step 4 of FIG. 18, the Device Registration Function 908 forwards the main body of the registration message to the Device Name Generation Function 910.

In step 5 of FIG. 18, in the registration message, the location is represented with its identifier. The Device Name Generation Function 910 sends the sub-location identifier validation request to the Sub-location Pool Manager 906.

In step 6 of FIG. 18, after the sub-location identifier is validated, the Sub-location Pool Manager 906 returns a confirmation to the Device Name Generation Function 910.

In step 7 of FIG. 18, the Device Name Generation Function 910 generates the device name based on the proposed name scheme and returns to the Device Registration Function 908.

In step 8 of FIG. 18, the Device Name Generation Function 910 also reports the new device and its name to the Device Name Pool Manager 914.

In step 9 of FIG. 18: The Device Registration Function 908 responds the device administrator with a successful registration response, to which the device name is attached.

It is understood that the entities performing the steps illustrated in FIG. 18 are logical entities that may be implemented in the form of software (i.e., computer-executable instructions) stored in a memory of, and executing on a processor of, a network node or computer system such as those illustrated in FIG. 38C or FIG. 38D. That is, the method(s) illustrated in FIG. 18 may be implemented in the form of software (i.e., computer-executable instructions) stored in a memory of a network node, such as the node or computer system illustrated in FIG. 38C or FIG. 38D, which computer executable instructions, when executed by a processor of the node, perform the steps illustrated in FIG. 18. It is also understood that any transmitting and receiving steps illustrated in FIG. 18 may be performed by communication circuitry of the node under control of the processor of the node and the computer-executable instructions (e.g., software) that it executes.

If the sub-location is invalid according to the Sub-location Pool Manager 906, then the device registration can fail and a failure response with error code (wrong location) can be returned to the device registration originator.

The Device Name Update Function 912 can be in charge of updating the device's name if its location or other context information contained in its name changes. The following, mainly focuses on and discusses the scenarios that the device's location changes. A device's location could change if it is moved by the device administrator or if the device itself has mobility. If the device itself has mobility, e.g. iRobot, its name does not need to be updated during the time frame when its mobility is due to carrying out its duty. As a result, in this disclosure, we only consider the mobility that results in a more permanent/long-term device location change and triggers the device name update, e.g. the device administrator moves a light from Bathroom #3 to Bathroom #2, or the device administrator carries his smart phone from Living room to Master bedroom. For devices with high mobility, we may use the approximate location for the naming. For example, for the wearable device on a patient, the location field in the name of the device can be set up based on the patient's approximate location such as the patient's home, hospital. As another example, for the transportation tracking tag, the location field in the name of the device can be set up based on the entire route of the transportation, e.g. on route 95 from NJ to PA.

The device administrator or device itself can send the name update request to the IDNS 902 if it is aware of the location description or the location identifier. The device may be able to get the new location identifier from its neighbor when it performs the neighbor discovery for routing purposes. If the device gets to the neighbors' names and realizes that the locations of those neighbors are different from the current one, it may conclude that its location/name needs to be updated.

Figure 19:
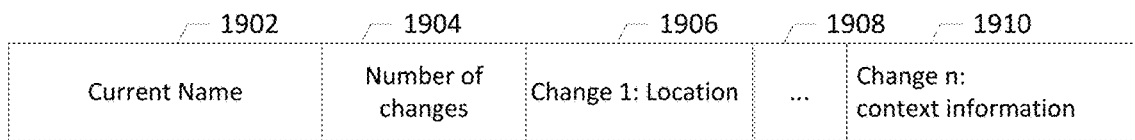
FIG. 19 is a diagram that shows an exemplary name update request message.

FIG. 19 is a diagram that shows an exemplary name update request message. The current name field 1902 allows the Device Name Update Function 912 to find the proper device to update in the Device Name Pool Manager 914. The number of changes field 1904 shows how many changes are included in the update message. The change fields 1906, 1908 and 1910 may include the device's location and other context information.

For ease of description, we assume here that the device administrator knows the new location identifier.

Figure 20:
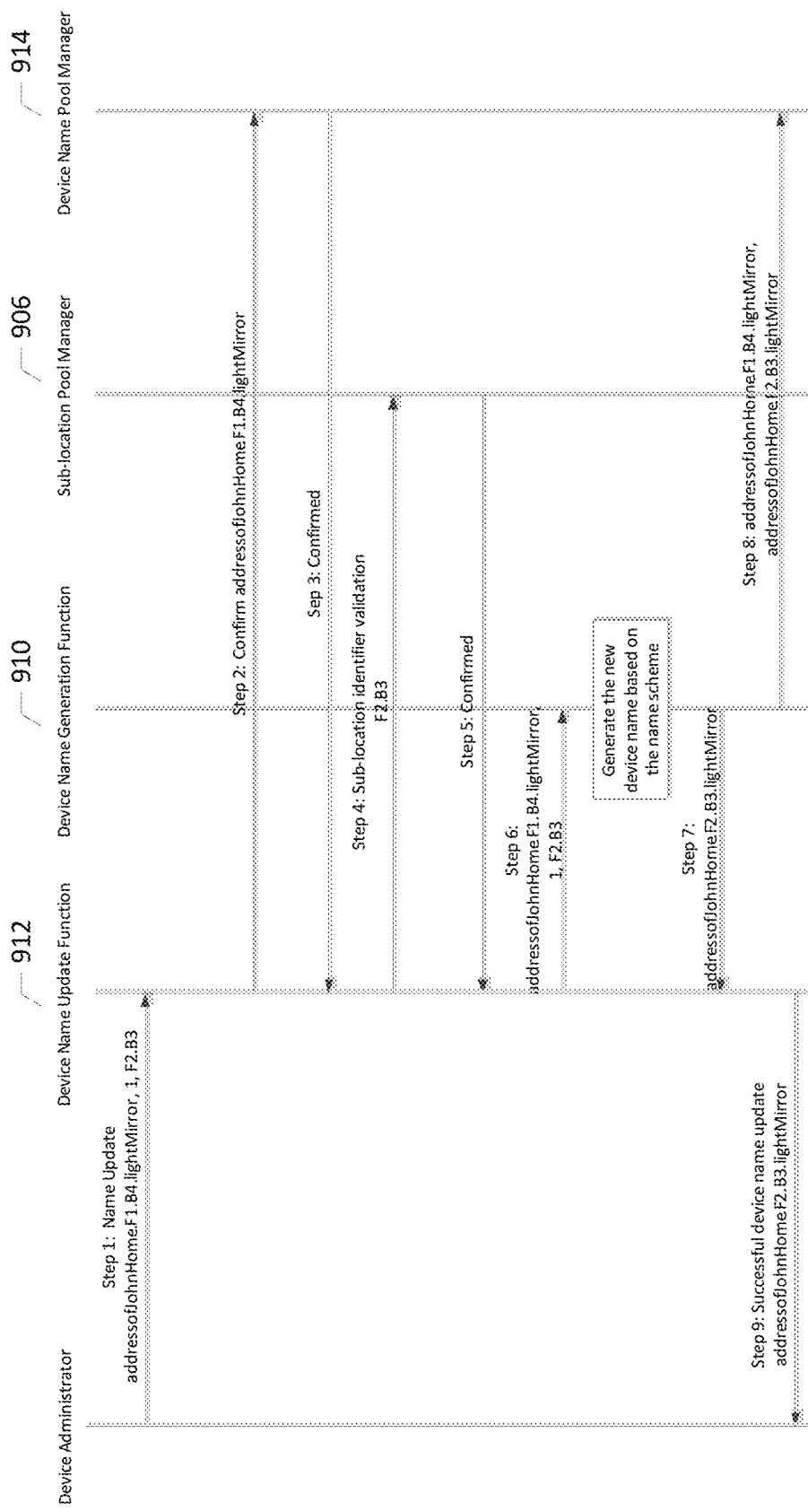
FIG. 20 is a message flow diagram of an exemplary IOT device name update process.

FIG. 20 is a message flow diagram of an exemplary IOT device name update process.

In step 1 of FIG. 20, the device administrator sends the update message to the Device Name Update Function 912 in the IDNS 902. In this example, the mirror light is moved from the Bathroom #4 on the first floor to the Bathroom #3 on the second floor.

In step 2 of FIG. 20, the Device Name Update Function 912 confirms with the Device Name Pool Manager 914 that the device name contained in the update message is a valid and is an existing one.

In step 3 of FIG. 20, the Device Name Pool Manager 910 confirms the device name with the Device Name Update Function 912.

In step 4 of FIG. 20, the Device Name Update Function 912 confirms with the Sub-location Pool Manager 906 that the new sub-location identifier is a valid one.

In step 5 of FIG. 20, the Sub-location Pool Manager 906 confirms the sub-location identifier with the Device Name Update Function 912.

In step 6 of FIG. 20, after both are confirmed in Step 2 and Step 3 of FIG. 20, the Device Name Update Function 912 forwards the message to the Device Name Generation Function 910 to generate the new device name.

In step 7 of FIG. 20, the Device Name Generation Function 910 generates the new device name, and forwards to the Device Name Update Function 912. In the scenario of FIG. 20, the location field of the name will be changed. The label filed of the name may not change unless some context information within the label changes.

In step 8 of FIG. 20, the Device Name Generation Function 910 updates the Device Name Pool Manager 914 with the new device name.

In step 9 of FIG. 20, the Device Name Update Function 912 returns the successful device name update with the new name to the device administrator.

It is understood that the entities performing the steps illustrated in FIG. 20 are logical entities that may be implemented in the form of software (i.e., computer-executable instructions) stored in a memory of, and executing on a processor of, a network node or computer system such as those illustrated in FIG. 38C or FIG. 38D. That is, the method(s) illustrated in FIG. 20 may be implemented in the form of software (i.e., computer-executable instructions) stored in a memory of a network node, such as the node or computer system illustrated in FIG. 38C or FIG. 38D, which computer executable instructions, when executed by a processor of the node, perform the steps illustrated in FIG. 20. It is also understood that any transmitting and receiving steps illustrated in FIG. 20 may be performed by communication circuitry of the node under control of the processor of the node and the computer-executable instructions (e.g., software) that it executes.

The Device Name Pool Manager 914 can support the recording and maintenance of the devices' names in the main location that the IDNS 902 is in charge of. The device name pool record of one embodiment is shown in Table 7. The devices can be indexed by their MAC addresses. The name field can include the device's current name, as well as the names used in the past.

TABLE 7

Device Name Pool Record

| MAC Address | Name (including current and history) |
| --- | --- |
| MAC Address 0 | addressofJohnHome.F1.Gt.Gw |
| MAC Address 1 | addressofJohnHome.F2.B3.lightMirror; addressofJohnHome.F1.B4.lightMirror |
| MAC Address 2 | addressofJohnHome.F1.K.fridge |
| ... | ... |

The Device Name Pool Manager 914 can also support locating the entry by a device's MAC address, its current name, or any past names. The Device Name Pool Manager 914 can maintain the device name record to follow the hierarchy as shown in FIG. 21.

The Device and Name Discovery Function 916 can handle the device or name queries from devices, device administrator, building administrator, applications, etc. The proposed name scheme also enables more advanced device discovery. A device query could be built to discover a group of devices deployed in the same location or with the same context information, by only browsing their names. For example, the queries could be:

Discover the devices located at addressOfJohnHome;
Discover the devices located on the first floor (F1) at addressOfJohnHome;
Discover the devices located in the bathroom 3 (Bathroom3) on the first floor (F1) at addressOfJohnHome.

Figure 21:
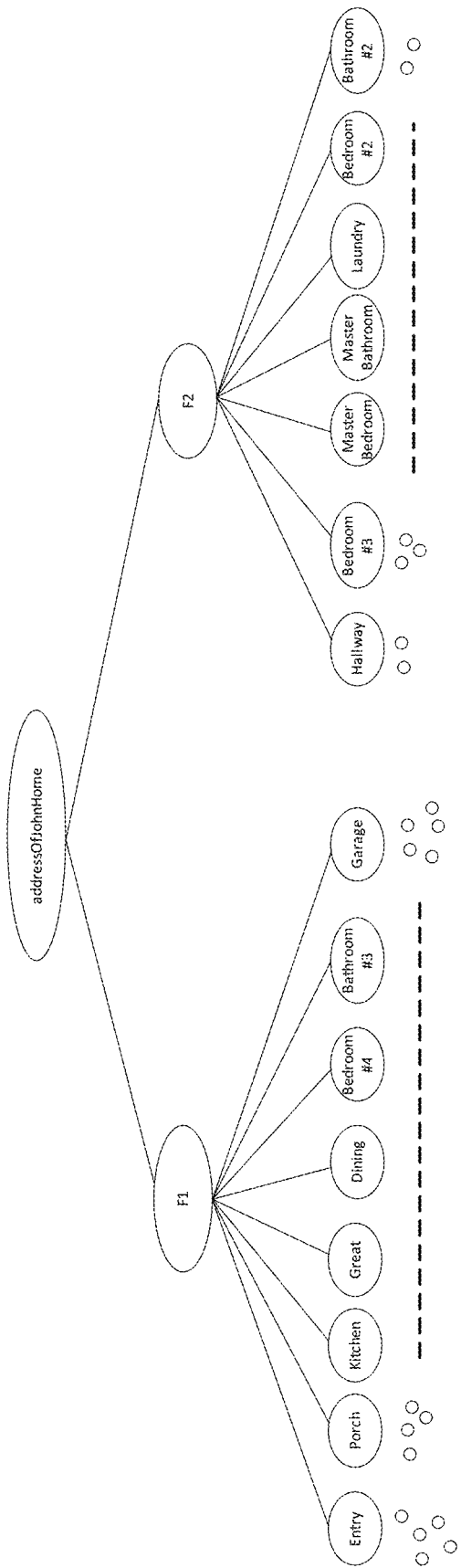
FIG. 21 is a diagram that illustrates the device name hierarchy.

According to the device name hierarchy shown in FIG. 21, the above queries can be easily responded to by returning all the devices under the parent node, which are addressOfJohnHome, F1, Bathroom3 correspondingly.

Figure 22:
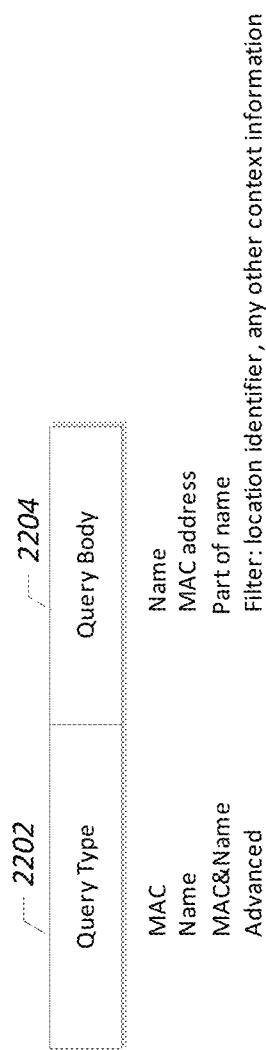
FIG. 22 is a diagram of an exemplary device and name discovery request message.

FIG. 22 is a diagram of an exemplary device and name discovery request message. The Query Type 2202 indicates the result that requestor wants the IDNS 902 to return.

The Query Type 2202 can indicate the MAC address of a device is to be queried. In the query body field 2204, a device's complete name is included for the Device Name Pool Manager 914 to find the matching device. The device's MAC address will be returned to the requester.

Figure 23:
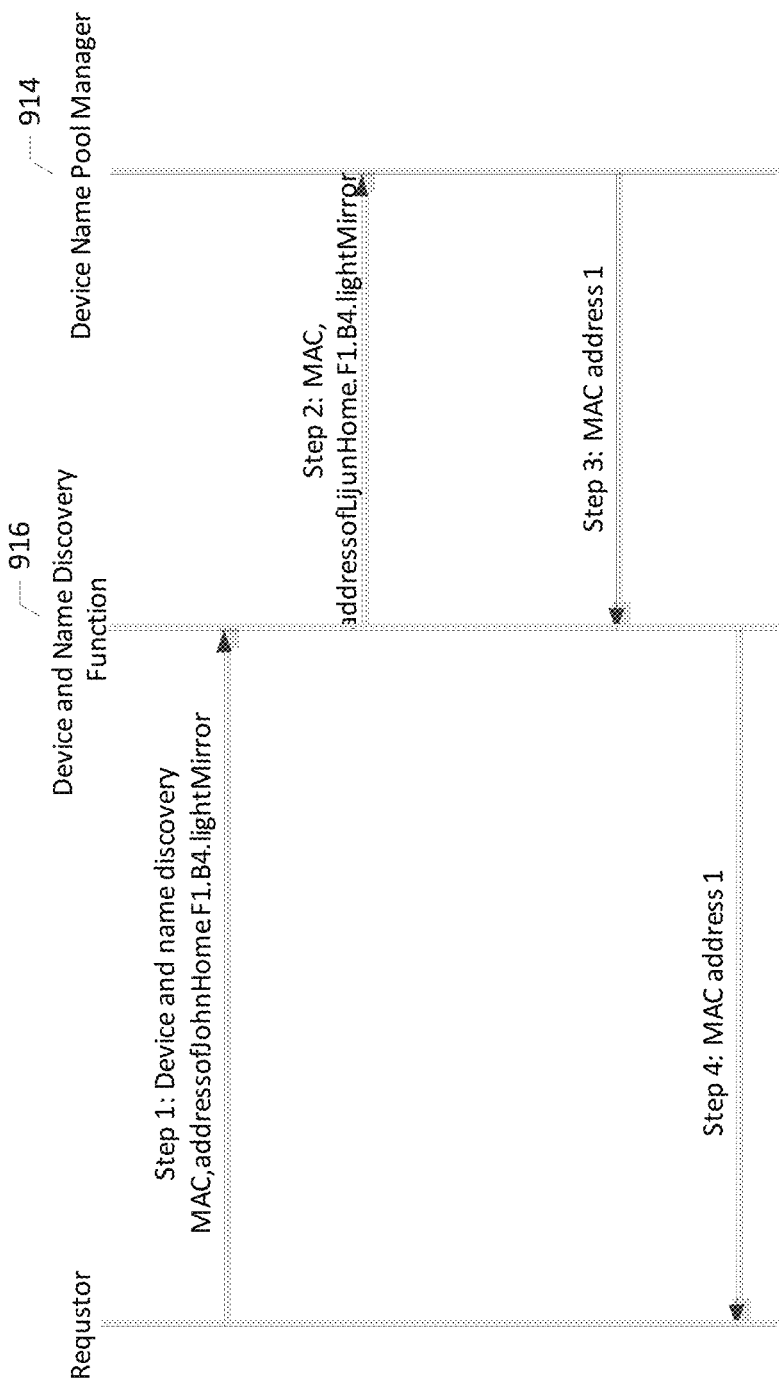
FIG. 23 is a message flow diagram that shows an exemplary MAC address query method.

FIG. 23 is a message flow diagram that shows an exemplary MAC address query method.

In step 1 of FIG. 23, the requestor sends the device and name discovery request to the Device and Name Discovery Function 916, indicating that it wants the matching device's MAC address to be returned.

In step 2 of FIG. 23, the Device and Name Discovery Function 916 forwards the device name to the Device Name Pool manager 914.

In step 3 of FIG. 23, the Device Name Pool Manager 914 finds the matching entry, and returns the MAC address of the device to the Device and Name Discovery Function 916.

In step 4 of FIG. 23, the Device and Name Discovery Function 916 responds the requestor with the matching device's MAC address.

The query type 2202 can indicate that the name of a device is to be queried. In the query body field 2204, a device's MAC address is included for the Device Name Pool Manager 914 to find the matching device. The device's name will be returned to the requester. The message flow is similar to FIG. 23 except the content in the messages.

The query type 2202 can indicate that both the MAC address and name of a device or devices are queried. In the query body field 2204, part of the device name is included for the Device Name Pool Manager 914 to find the matching names, as well as MAC addresses. The devices' MAC addresses and corresponding names will be returned to the requester. The message flow is similar to FIG. 23 except the content in the messages.

The query type 2202 can indicate that it is an advanced device and name query. In the query body field, a filter is designed with designated location description/identifier and other context information, and is included for the Device Name Pool Manager 914 to find all the matching devices. The devices' MAC addresses and corresponding names can be returned to the requester. The message flow is similar to FIG. 23. However, if the query body includes only the location description, the Device and Name Discovery Function needs to query for the location identifier from the Sub-location Pool Manager 906.

It is understood that the entities performing the steps illustrated in FIG. 23 are logical entities that may be implemented in the form of software (i.e., computer-executable instructions) stored in a memory of, and executing on a processor of, a network node or computer system such as those illustrated in FIG. 38C or FIG. 38D. That is, the method(s) illustrated in FIG. 23 may be implemented in the form of software (i.e., computer-executable instructions) stored in a memory of a network node, such as the node or computer system illustrated in FIG. 38C or FIG. 38D, which computer executable instructions, when executed by a processor of the node, perform the steps illustrated in FIG. 23. It is also understood that any transmitting and receiving steps illustrated in FIG. 23 may be performed by communication circuitry of the node under control of the processor of the node and the computer-executable instructions (e.g., software) that it executes.

Figure 24:
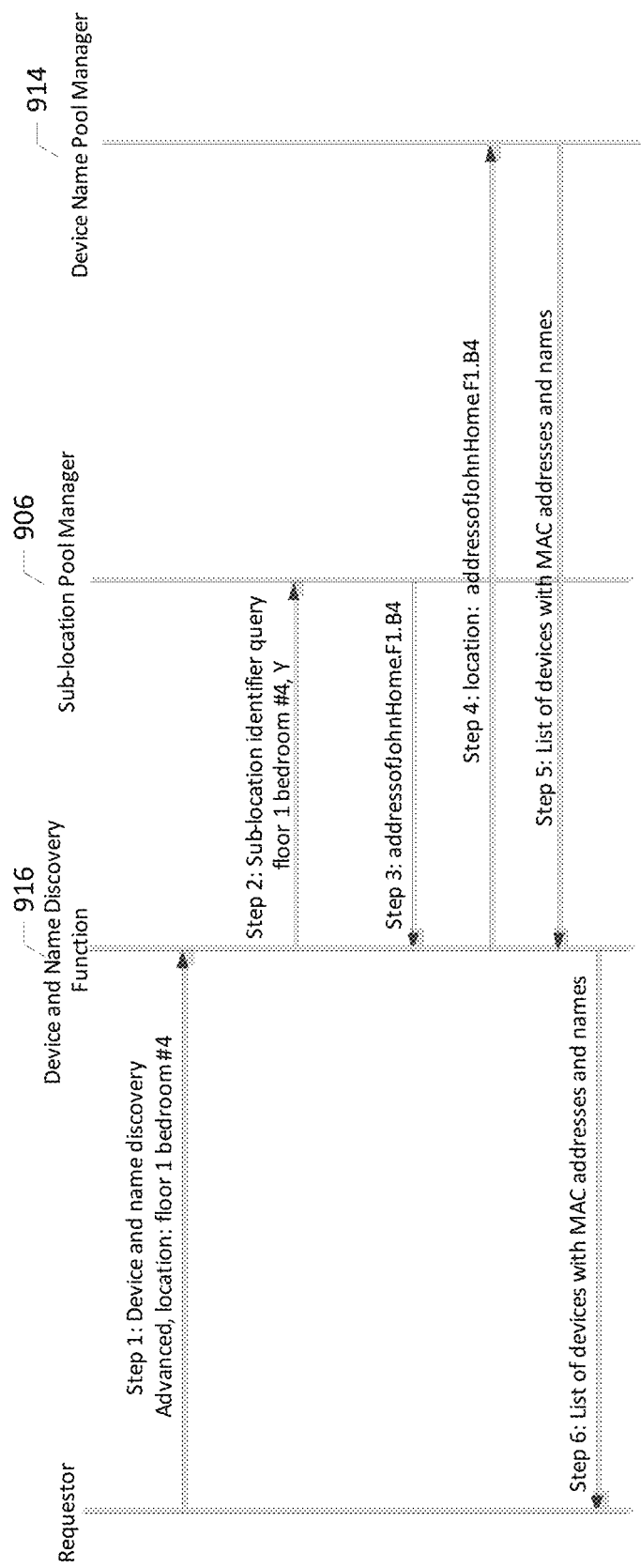
FIG. 24 is a flow diagram that shows an exemplary advanced device and name query.

FIG. 24 is a flow diagram that shows an exemplary advanced device and name query.

In step 1 of FIG. 24, the requestor sends the device and name discovery request to the Device and Name Discovery Function 916, indicating that it is an advance query. The requestor wants to discover all the devices in Bedroom #4 on the floor 1.

In step 2 of FIG. 24, the Device and Name Discovery Function 916 sends the sub-location identifier query to the Sub-location Pool Manager 906.

In step 3 of FIG. 24, the Sub-location Pool Manager 906 returns the corresponding sub-location identifier.

In step 4 of FIG. 24, the Device and Name Discovery Function 916 forwards the sub-location identifier to the Device Name Pool manager 914.

In step 5 of FIG. 24, the Device Name Pool Manager 914 finds the matching entries, and returns the list of MAC addresses of the devices to the Device and Name Discovery Function 916.

In step 6 of FIG. 24, the Device and Name Discovery Function 916 responds the requestor with the matching device's MAC addresses and names.

It is understood that the entities performing the steps illustrated in FIG. 24 are logical entities that may be implemented in the form of software (i.e., computer-executable instructions) stored in a memory of, and executing on a processor of, a network node or computer system such as those illustrated in FIG. 38C or FIG. 38D. That is, the method(s) illustrated in FIG. 24 may be implemented in the form of software (i.e., computer-executable instructions) stored in a memory of a network node, such as the node or computer system illustrated in FIG. 38C or FIG. 38D, which computer executable instructions, when executed by a processor of the node, perform the steps illustrated in FIG. 24. It is also understood that any transmitting and receiving steps illustrated in FIG. 24 may be performed by communication circuitry of the node under control of the processor of the node and the computer-executable instructions (e.g., software) that it executes.

The use of the IDNS 902 can enable a number of features in an IoT network. For example, the naming scheme generates different levels of physical subnetting of the IoT networks. In other words, all devices that belong to a subnet have a common, identical prefix in their names. For example:

addressOfJohnHome is the prefix in the names of all devices in the house.

addressofJohnHome.F1 is the prefix in the names of all devices on the first floor of the house.

addressofJohnHome.F1.Kitchen is the prefix in the names of all devices in the kitchen on the first floor of the house.

The subnetting enabled by the proposed naming scheme has the following benefits:

The address allocation of the devices become more efficient and the offers are unique.

The subnetting has advantages in device management when sub-networks are administratively controlled by different entities, which is discussed in Section 5.3.3 about device group operation.

The subnetting in the Internet designates some high-order bits from the host part as subnet mask and groups the hosts into a subnet. The hosts in the same subnet with the same mask can be addressed through the same next hop router from the same source node. However, the IoT devices with the proposed naming that form the subnet defined in this section may be addressed through different next hop routers. In other words, the IoT devices within the subnet may talk to a device outside the subnet through different intermediate nodes. Due to the wireless connection among IoT devices, it is very likely that the devices within the same subnet may pick up or route through different next hop devices, depending on the routing algorithm used (different properties may be considered in choosing the next hop node, e.g. link bandwidth, congestion, signal strength). If the devices in the same subnet are routed by different routing devices, they can be aggregated into different groups, each of which has the same routing device as the next hop.

The IDNS 902 and the naming scheme of table 5 can be used to support name routing. Routing is the task of finding a path from a sender to a desired destination. In the IP "Internet Model" this reduces primarily to a matter of finding a series of routers between the source and destination network. As long as a message remains on a single network or subnet, any forwarding problems are the responsibility of technology that is specific to the network. In IoT networks, such as smart home network, there are many scenarios that are advantageous for a device to send messages to another device directly.

For example, the door lock may be configured by the home owner to send a message/command to the lights in the living room to be turned on. The fridge may be configured to send a shopping list to the home gateway at any time. When the user arrives home, the shopping list is sent from the home gateway to the user's smart phone. The smoke sensor in the kitchen may be configured to send a message/command to the smoke sensor located at the hallway on the second floor to beep too, such that the home owner can hear it from the master bedroom.

The following describes a Name Routing Protocol (NRP) can be used to do routing in an IoT network. The naming scheme for IoT devices discussed above can facilitate the message routing required in the above scenarios. IoT devices which have the routing capability (i.e. Routing Device, which maintains a routing table and is able to route the messages to the next hop towards the destination) do not need to always be configured with IP addresses to enable layer 3 routing.

Figure 25:
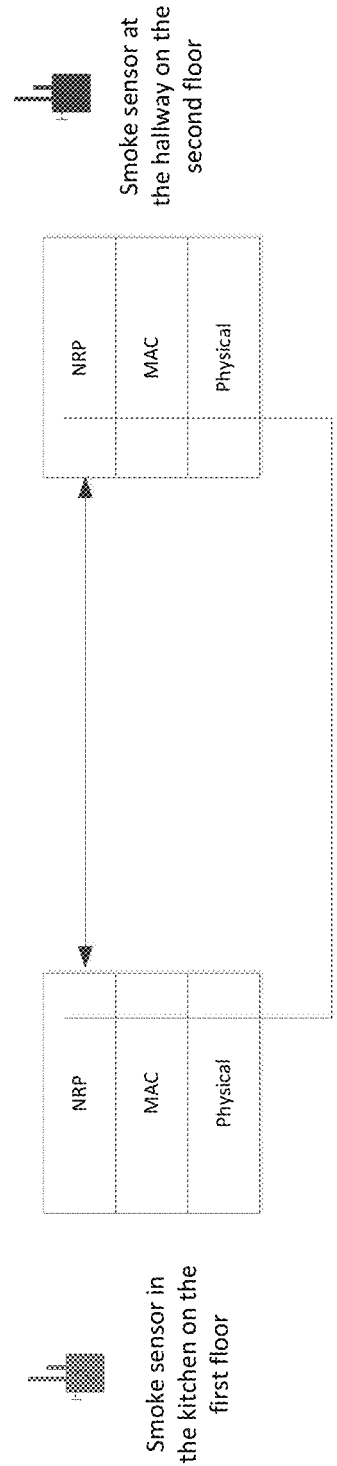
FIG. 25 is a diagram that illustrates a smoke sensor in the kitchen on the first floor and a smoke sensor at the hallway on the second floor that are resource constrained devices.
Figure 26:
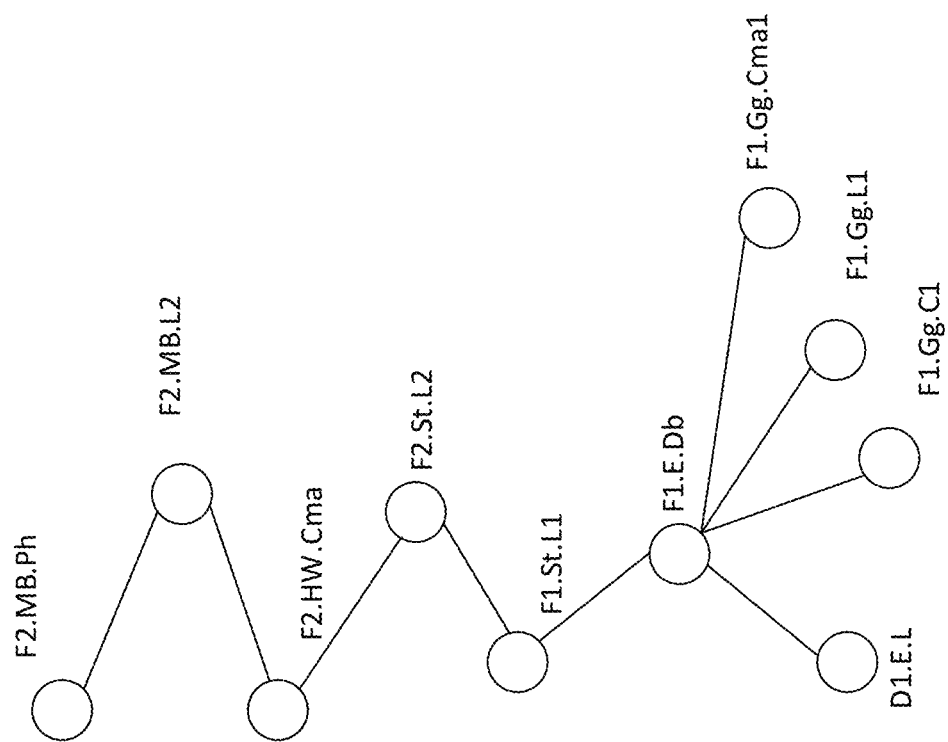
FIG. 26 is a diagram that shows a topology that involves the doorbell and the phone in the master bedroom.

FIG. 25 is a diagram that illustrates a smoke sensor in the kitchen on the first floor and a smoke sensor at the hallway on the second floor that are resource constrained devices. With the proposed name scheme and NRP, they do not need to implement the full protocol stack to enable the direct communication between them. NRP is an option/alternative if IP addresses are not available to the IoT Devices.

Each routing device can keep a routing database with one entry for every possible destination in the small area network (e.g. the home network). Note, it is possible that the routing device can also maintain the routing entries for devices outside of the small area network. In one embodiment, the routing devices other than the gateways do not keep such entries to save the storage and resource/energy consumption. The gateways can be assigned with IP addresses to communicate with the outside world on behalf of the indoor devices.

In one embodiment, each entry in the routing database can keep the following information about each destination:
Device Name/Network Name: Device name is the name of the IoT devices discussed above. The network name could be represented as different building blocks of a particular address, e.g.
addressOfJohnHome is the network name for all devices in the house.
addressofJohnHome.F1 is the network name for all devices on the first floor of the house.
addressofJohnHome.F1.Kitchen is the network name for all devices in the kitchen on the first floor of the house.
Routing Device: the first routing device along the route to the destination.
Metric: a number, indicating the distance to the destination.
Effective Time: the amount of time the routing path is considered to be valid. The routing path may involve resource constrained devices, which may go asleep periodically or following certain schedule, when the routing path to the destination should be considered to be invalid.

Each routing device can send routing table broadcast messages that describe the routing database as it currently exists in the routing device, whose message body is shown in Table 10. It is likely to maintain optimal routes for the entire area network by using only information obtained from the neighboring routing devices. A Distance Vector Algorithm can be used to calculate the paths.

Through neighbor discovery (e.g. 6LoWPAN), every device is able to find its one-hop neighbors, from which the routing table is built up. In the following, we use the doorbell at the entry as an example to show how routing table is built from scratch, mainly focusing on how the doorbell finds the routing path towards the phone in the master bedroom. (In the following, the first hierarchy of the devices' identifiers is not shown for presentation simplicity).

The doorbell F1.E.Db discovers its neighbors which are in the one-hop distance from itself: F1.E.L (entry light), F1.Gg.L1 (garage light 1), F1.Gg.Cma1 (garage carbon monoxide alarm 1), F1.Gg.C1 (garage car 1). During the neighbor discovery, the doorbell also gets the knowledge of the neighbors' sleeping schedule or presence schedule as well (i.e. the schedule when the device is available to provide routing service/function). The doorbell uses the above information to form an initial routing table as shown in Table 8.

TABLE 8

Routing Table - Doorbell F1.E.Db

| Device/Network Name | Next Hop | Distance | Effective Time |
|---|---|---|---|
| F1.E.L | F1.E.L | 1 | always |
| F1.Gg.L1 | F1.Gg.L1 | 1 | always |
| F1.Gg. Cma1 | F1.Gg. Cma1 | 1 | 2 PM to 5 PM |
| F1.Gg.C1 | F1.Gg.C1 | 1 | 11:00 PM to 6:00 AM |

The light F2.MB.L2 in the master bedroom can reach the phone (F2.MB.Ph) directly, which has one entry for F2.MB.Ph in its routing table as shown in Table 9 (F2.HW.Cma is the carbon monoxide alarm in the hallway on the second floor).

TABLE 9

Routing Table - Light 2 in Master Bedroom F2.MB.L2

| Device/Network Name | Next Hop | Distance | Effective Time |
|---|---|---|---|
| F2.MB.Ph | F2.MB.Ph | 1 | always |
| F2.HW.Cma | F2.HW.Cma | 1 | 10:00 to 18:00 |

It is understood that the functionality illustrated in FIG. 25 may be implemented in the form of software (i.e., computer-executable instructions) stored in a memory of, and executing on a processor of, a node of an M2M network (e.g., a server, gateway, device, or other computer system), such as one of those illustrated in FIG. 38C or 38D described below.

Figure 27:
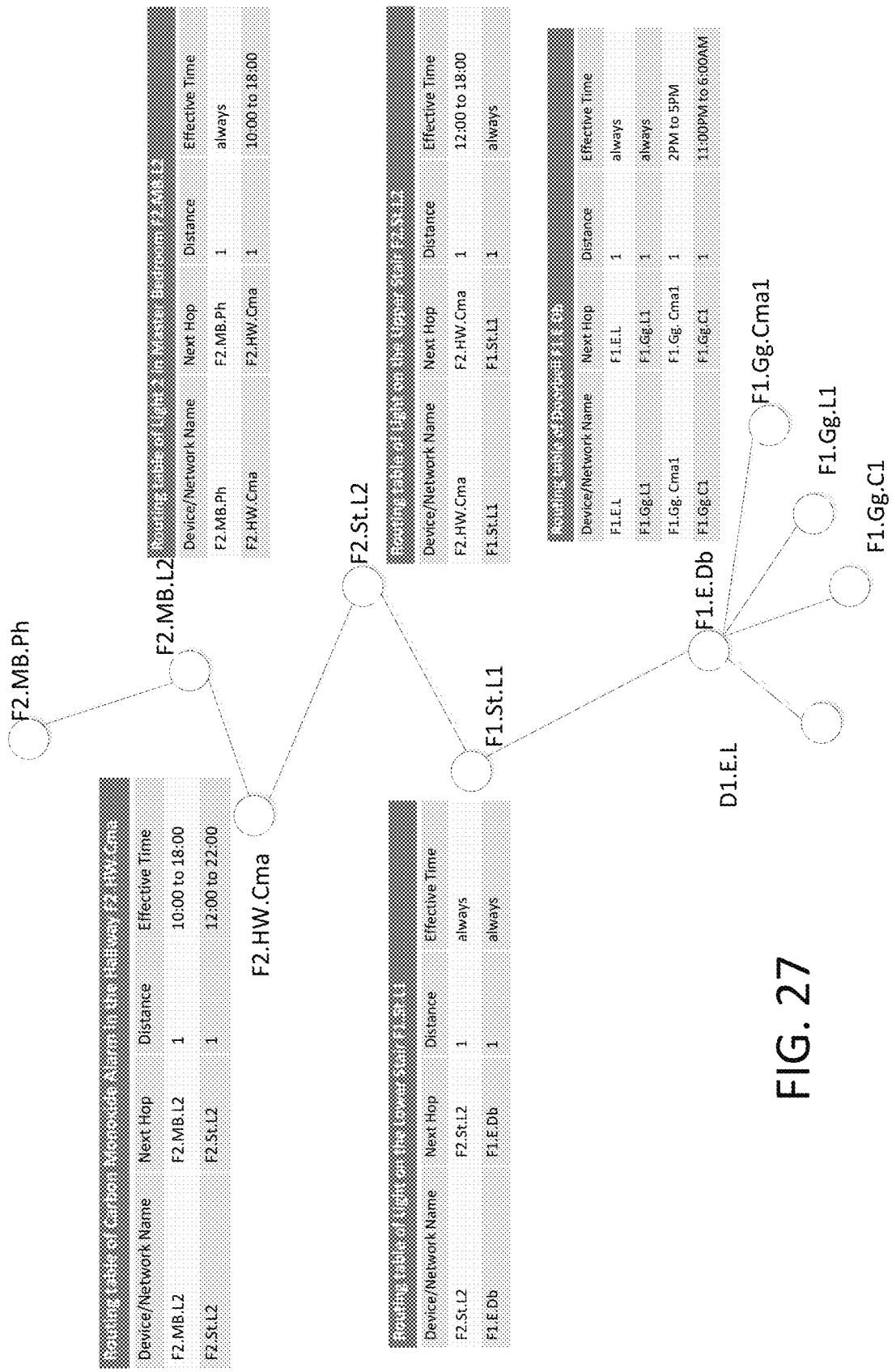
FIG. 27-31 are diagrams that illustrate an exemplary routing table and topology of one example.

As a result, initially after the neighbor discovery, the routing tables in the routing devices are shown in FIG. 27.

The light 2 in the master bedroom sends its routing table to its neighbors, which is carried in the message following the format as shown in Table 10:
Type: indicates it is a message containing all or part of the sender's routing table.
TTL: indicates the time to live for the entries contained in the message.
Routing table entry: each contains one entry in the routing table, which follows the same format as Device/Network Name, Next Hop, Distance and Effective Time. The maximum number of entries contained in the message is limited to 5 (this number is flexible to be updated).

TABLE 10

Routing Table Broadcast Message

| Type | TTL |
|---|---|
| Routing table entry (5) ||

Figure 28:
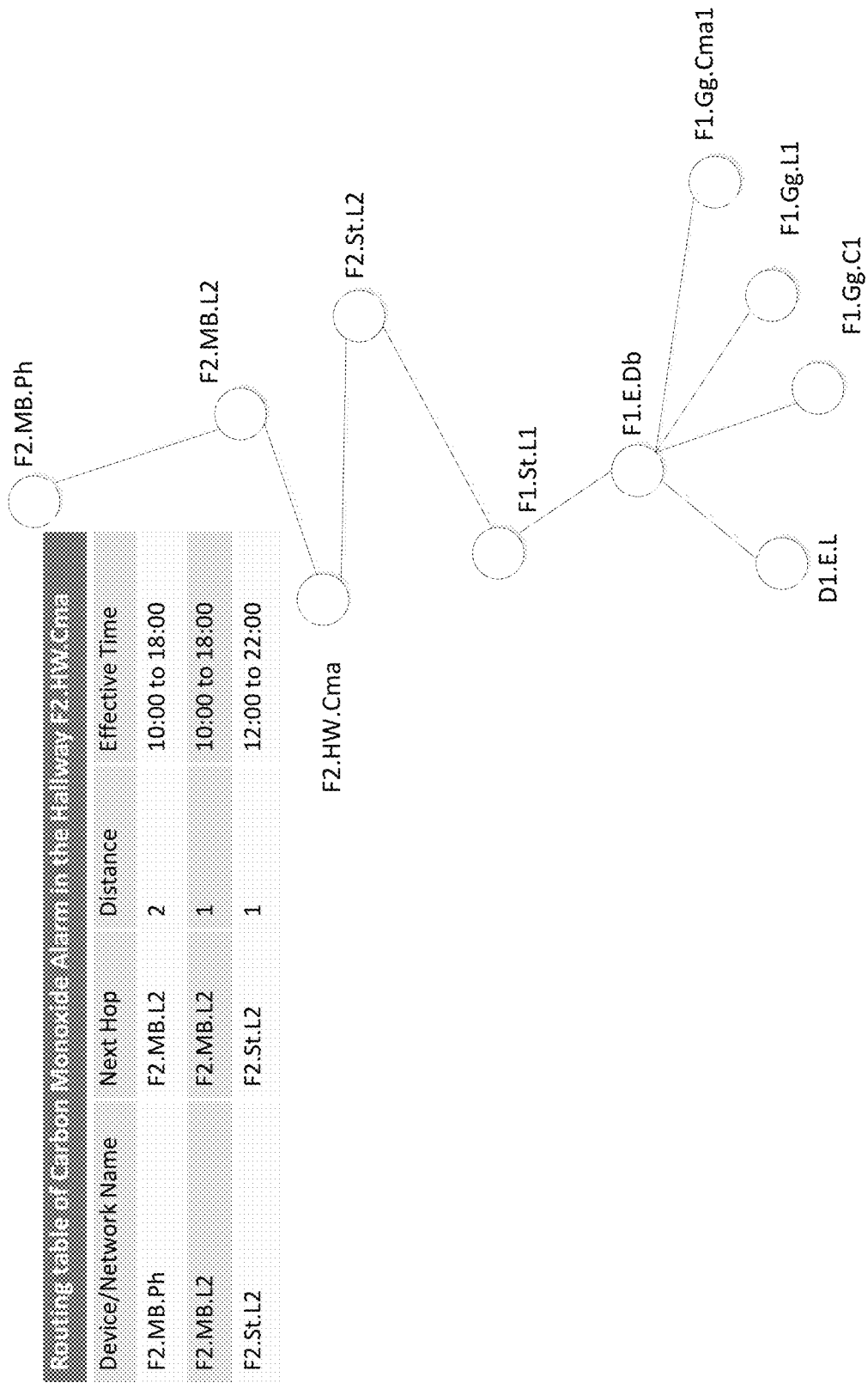

When the carbon monoxide alarm in the hallway on the second floor F2.HW.Cma receives the routing table broadcast message from the light in the master bedroom F2.MB.L2, it updates its own routing table as shown in Table 11 and FIG. 28. The effective time of entry of F2.MB.Ph and F2.MB.L2 is updated to 10:00 to 18:00 because F2.HW.Cma only provides routing function from 10:00 to 18:00 from Table 9.

TABLE 11

Routing Table - Carbon Monoxide Alarm in
the Hallway on the Second Floor F2.HW.Cma

| Device/Network Name | Next Hop | Distance | Effective Time |
|---|---|---|---|
| F2.MB.Ph | F2.MB.L2 | 2 | 10:00 to 18:00 |
| F2.MB.L2 | F2.MB.L2 | 1 | 10:00 to 18:00 |
| F2.St.L2 | F2.St.L2 | 1 | 12:00 to 22:00 |

Figure 29:
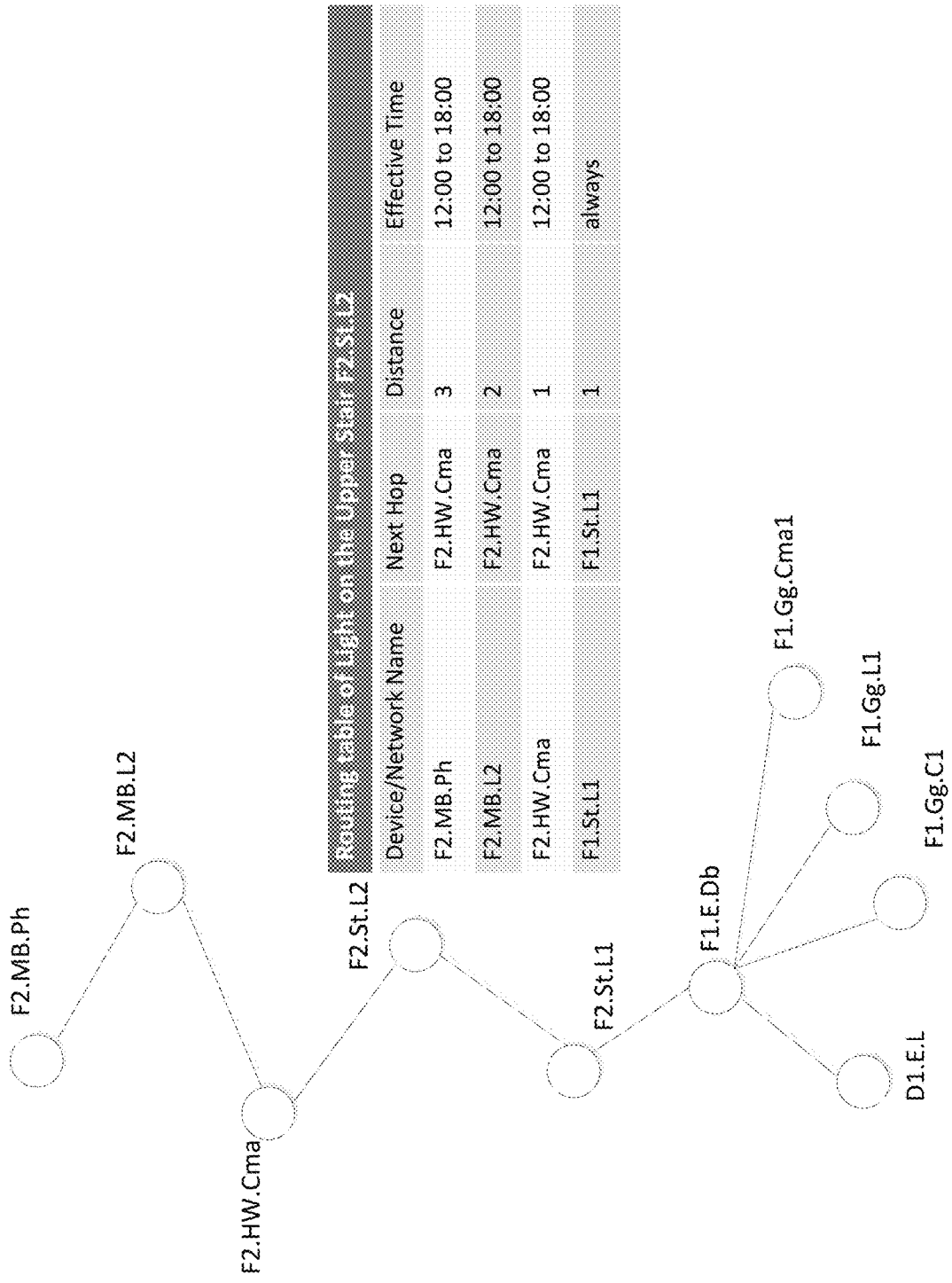
Figure 30:
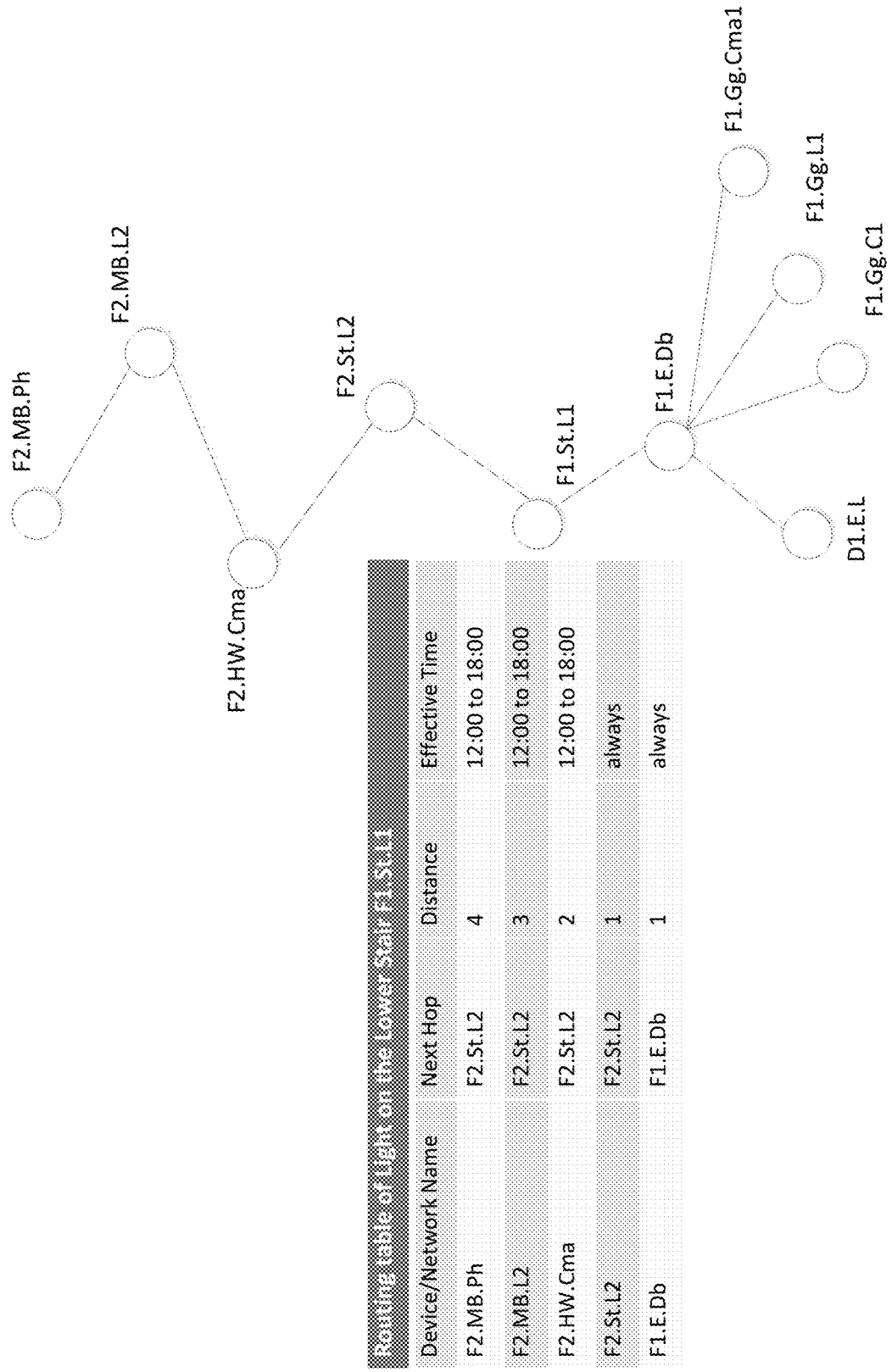

When the light on the upper stair F2.St.L2 receives the routing table broadcast message from the carbon monoxide alarm in the hallway on the second floor F2.HW.Cma, it updates its own routing table as shown in Table 12 and FIG. 29. The effective time of entry of F2.MB.Ph and F2.MB.L2 is updated to 12:00 to 18:00, which takes the joint set from the effective time of the devices involved in the routing path.

TABLE 12

Routing Table - Light on the Upper Stair F2.St.L2

| Device/Network Name | Next Hop | Distance | Effective Time |
|---|---|---|---|
| F2.MB.Ph | F2.HW.Cma | 3 | 12:00 to 18:00 |
| F2.MB.L2 | F2.HW.Cma | 2 | 12:00 to 18:00 |
| F2.HW.Cma | F2.HW.Cma | 1 | 12:00 to 18:00 |
| F1.St.L1 | F1.St.L1 | 1 | always |

When the light on the lower stair F1.St.L1 receives the routing table broadcast message from the light on the upper stair F2.St.L2, it updates its own routing table as shown in Table 13.

TABLE 13

Routing Table - Light on the Lower Stair F1.St.L1

| Device/Network Name | Next Hop | Distance | Effective Time |
|---|---|---|---|
| F2.MB.Ph | F2.St.L2 | 4 | 12:00 to 18:00 |
| F2.MB.L2 | F2.St.L2 | 3 | 12:00 to 18:00 |
| F2.HW.Cma | F2.St.L2 | 2 | 12:00 to 18:00 |
| F2.St.L2 | F2.St.L2 | 1 | always |
| F1.E.Db | F1.E.Db | 1 | always |

Figure 31:
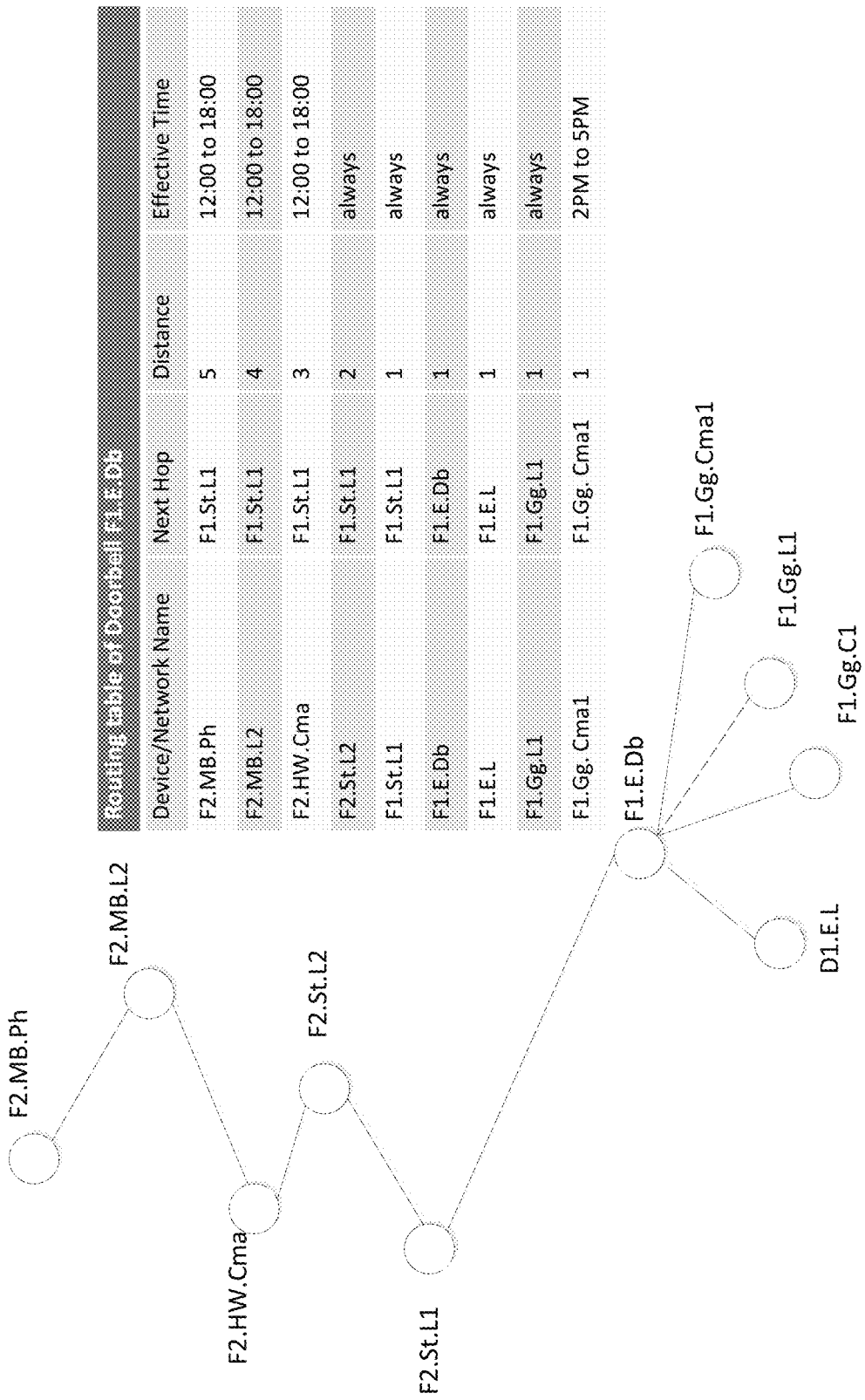

When the doorbell at the entry F1.E.Db receives the routing table broadcast message from the light on the lower stair F1.St.L1, it updates its own routing table as shown in Table 14 and FIG. 31. Through the above process, the doorbell is able to find the routing path to the phone in the master bedroom on the second floor. If the communication needs to happen out of the effective time of the entry, it is considered that the doorbell cannot reach the phone in the master bedroom.

TABLE 14

Updated Routing Table - Doorbell F1.E.Db

| Device/Network Name | Next Hop | Distance | Effective Time |
|---|---|---|---|
| F2.MB.Ph | F1.St.L1 | 5 | 12:00 to 18:00 |
| F2.MB.L2 | F1.St.L1 | 4 | 12:00 to 18:00 |
| F2.HW.Cma | F1.St.L1 | 3 | 12:00 to 18:00 |
| F2.St.L2 | F1.St.L1 | 2 | always |
| F1.St.L1 | F1.St.L1 | 1 | always |
| F1.E.Db | F1.E.Db | 1 | always |
| F1.E.L | F1.E.L | 1 | always |
| F1.Gg.L1 | F1.Gg.L1 | 1 | always |
| F1.Gg.Cma1 | F1.Gg.Cma1 | 1 | 2 PM to 5 PM |
| F1.Gg.C1 | F1.Gg.C1 | 1 | 11:00 PM to 6:00 AM |

The doorbell may aggregate multiple entries of the devices to one entry. As an example shown in Table 15, the entry of F2.MB.X (X is used to represent the devices inside the master bedroom who can be reached from the doorbell with next hop of the light on the lower stair F1.St.L1) is aggregated from the entries of F2.MB.Ph, F2.MB.L2.

TABLE 15

Aggregated Routing Table - Doorbell F1.E.Db

| Device/Network Name | Next Hop | Distance | Effective Time |
|---|---|---|---|
| F2.MB.X | F1.St.L1 | 4 | 12:00 to 18:00 |
| F2.HW.Cma | F1.St.L1 | 3 | 12:00 to 18:00 |
| F2.St.L2 | F1.St.L1 | 2 | always |
| F1.E.Db | F1.E.Db | 1 | always |
| F1.E.L | F1.E.L | 1 | always |
| F1.Gg.L1 | F1.Gg.L1 | 1 | always |
| F1.Gg.Cma1 | F1.Gg.Cma1 | 1 | 2 PM to 5 PM |
| F1.Gg.C1 | F1.Gg.C1 | 1 | 11:00 PM to 6:00 AM |

The device group operation is enabled by the functionalities provided by the proposed IDNS and NRP that does not need the involvement of the upper layers, e.g. service layer.

The Device and Name Discovery Function 916 can support advanced device discovery, such that a group of devices that satisfies the criteria put in the query body field can be obtained by the requester. In the example shown in FIG. 33, the requester is the door lock, which wants to discover all the lights in the living room. After this step, the door lock obtains the identifiers/names of all lights in the living room: addressofJohnHome.F1.L.L1, . . . , addressofJohnHome.F1.L.L6.

Figure 32:
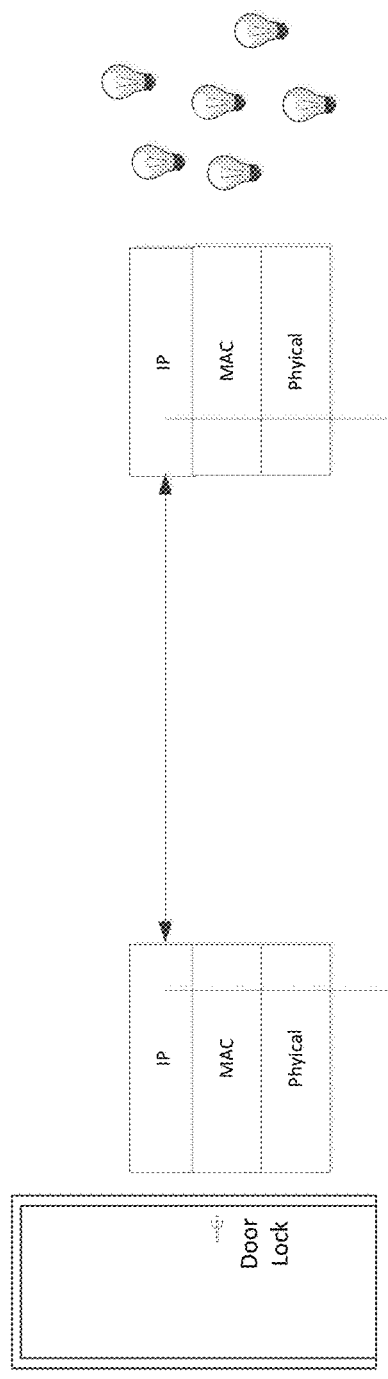
FIG. 32 is a diagram of an example where a door lock and lights are connected using IP.
Figure 33:
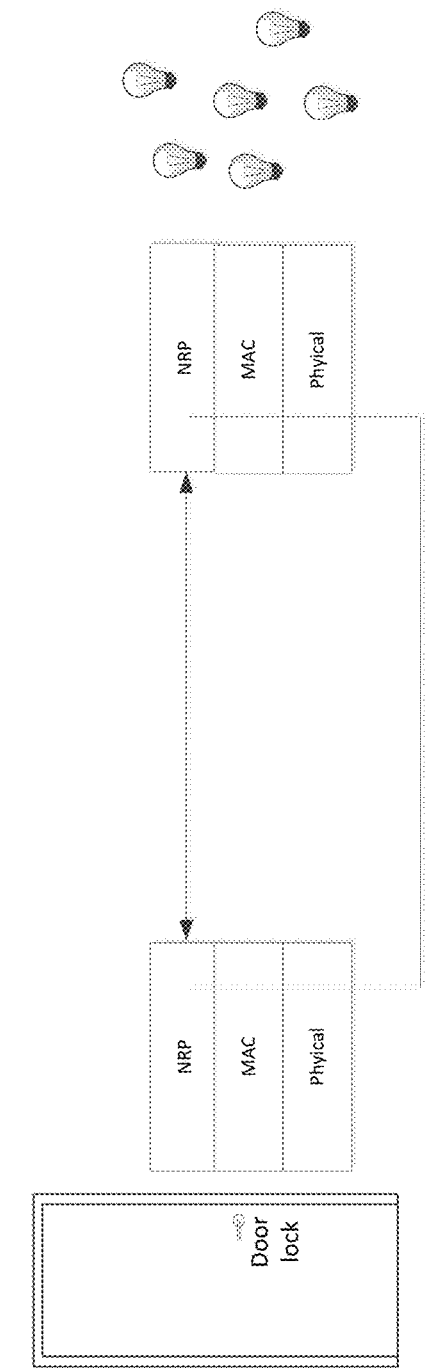
FIG. 33 is a diagram of an example where a door lock and lights are connected using NRP.

The door lock includes the command as the payload in the layer-3 message (e.g. ICMP message). It is very likely that the devices located in the same sub-location are in the same subnet. As a result, in order to optimize the routing efficiency between the door lock to the multiple lights, the source device always selects one of the destination devices (primary destination) to put in the destination field for routing. Meanwhile, the rest of the destination devices will be attached in the payload of the layer-3 message. After the message reaches the primary destination device, it can be in charge of distributing the message to the rest of the destinations correspondingly. The layer-3 could be IP or NRP as shown in FIG. 32 and FIG. 33.

Figure 34:
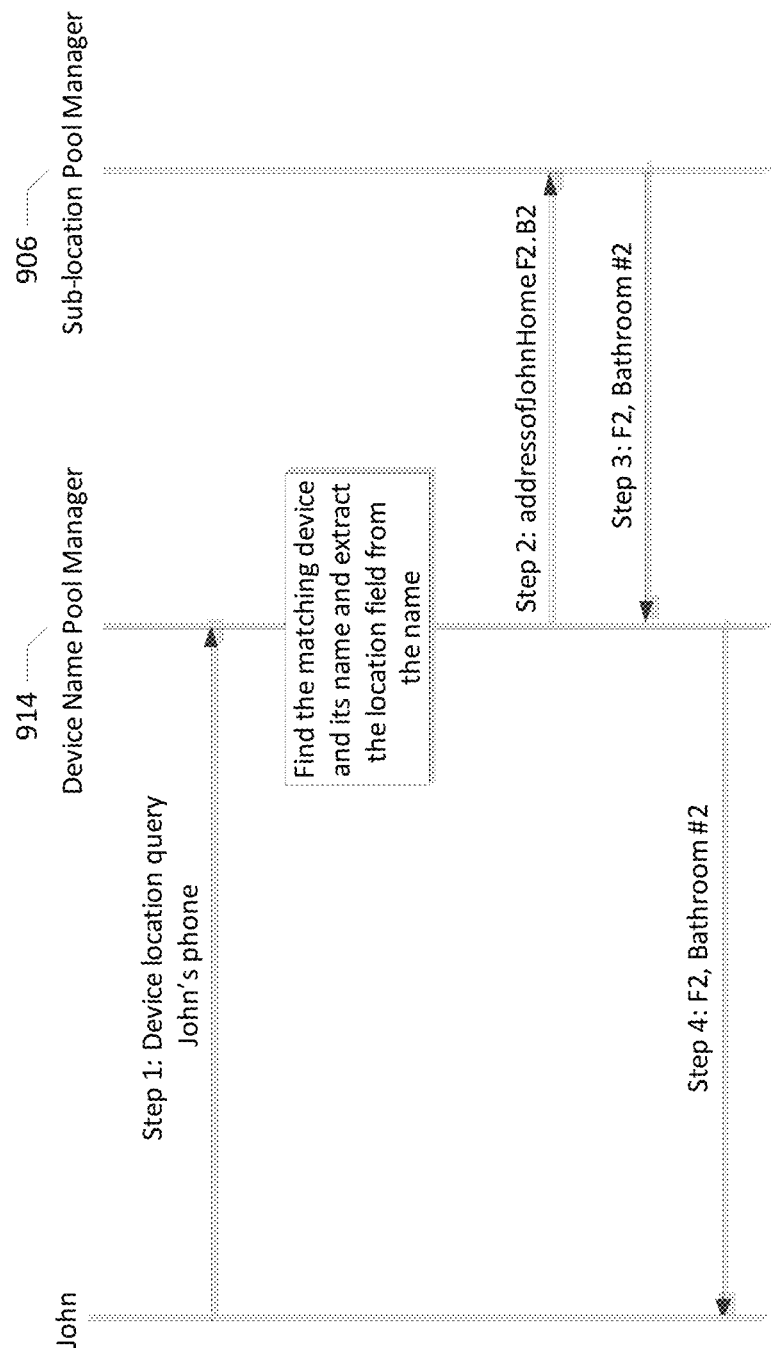
FIG. 34 is a message flow diagram that illustrates a method to find devices.

The proposed name scheme and INDS can help a person to locate/find his devices. For example, the home owner may forget where he placed his phone. FIG. 34 is a message flow diagram that illustrates a method to find devices. In step 1 of FIG. 34, the person sends device location query to the IDNS. In the query, the person can input any description that could help IDNS identify the device, e.g. tag (John's phone). The Device Name Pool Manager 914 can handle the query. It can use the tag included in the query to search all devices in the device name pool, and obtains the one matching the tag.

In step 2 of FIG. 34, the Device Name Pool Manager 914 extracts the location field out of the device name, and sends a location description query to the Sub-location Pool manager 906.

In step 3 of FIG. 34, the Sub-location Pool Manager 906 can return the corresponding sub-location description to the Device Name Pool Manager 914.

In step 4 of FIG. 34, the Device Name Pool Manager 914 can return the sub-location description to the person, who will know where his phone is placed.

In one embodiment, the major control messages used in this disclosure are as follows:

(1) Sub-location registration request and response messages.

(2) Device registration request and response messages.

(3) Sub-location identifier query and response messages.

(4) Sub-location identifier validation and response messages.

(5) Device name update and response messages.

(6) Device and name discovery request and response messages.

These control messages can be carried by ICMP/ICMPv6 messages. For example, the unused ICMP message types from 42 to 252 can be used for them, e.g. 100, 101, 102, 103, 104, 105 are reserved for the above 6 request messages with code 0, while the corresponding response message has the same message type but code 1. Similarly, the unused ICMPv6 message types from 159 to 199 can be used for them, e.g. 170, 171, 172, 173, 174, 175 are reserved for the above 6 request messages.

The content of the messages can be carried in the message body field of the ICMP message.

It is understood that the entities performing the steps illustrated in FIG. 34 are logical entities that may be implemented in the form of software (i.e., computer-executable instructions) stored in a memory of, and executing on a processor of, a network node or computer system such as those illustrated in FIG. 38C or FIG. 38D. That is, the method(s) illustrated in FIG. 34 may be implemented in the form of software (i.e., computer-executable instructions) stored in a memory of a network node, such as the node or computer system illustrated in FIG. 38C or FIG. 38D, which computer executable instructions, when executed by a processor of the node, perform the steps illustrated in FIG. 34. It is also understood that any transmitting and receiving steps illustrated in FIG. 34 may be performed by communication circuitry of the node under control of the processor of the node and the computer-executable instructions (e.g., software) that it executes.

Figure 35:
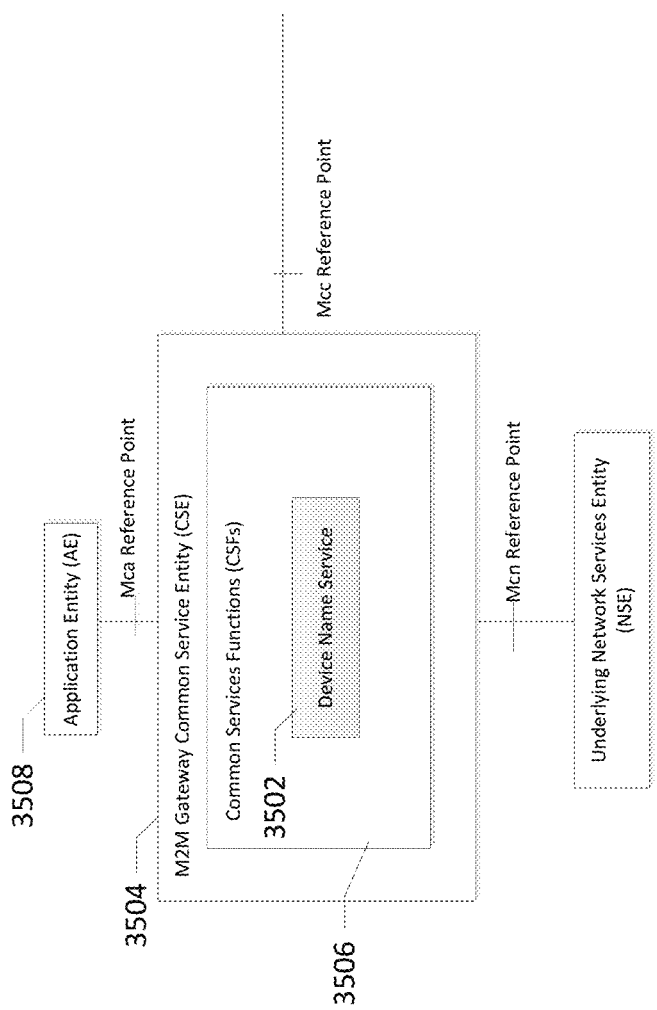
FIG. 35 is a diagram of an exemplary oneM2M embodiment with a device Name Service in CSE.

FIG. 35 is a diagram of an exemplary oneM2M embodiment with a device Name Service 3502 in CSE 3504. oneM2M defines the capabilities supported by the oneM2M Service Layer. The oneM2M Service Layer is instantiated as a Capability Services Entity (CSE) 3504 which comprises a set of Capability Service Functions (CSF) 3506. As one embodiment, the proposed IDNS 902 could be hosted in a CSE 3504 as an oneM2M CSF 3506. The CSE 3504 could be residing in the gateway in the local area network (e.g. a home network). The Device Name Service CSF 3502 is in charge of that how the device name is generated from the location and other context information, updated due to location change or context variation, and discovered. Note, the Device Name Service 3502 may have interaction with the existing Registration CSF or some of the functionalities of Device Name Service may be moved to the existing Registration CSF, i.e.: sub-location registration function 904, device registration function 908.

A building administrator AE 3508 can talk to the Device Name Service CSF 3502 via the Mca reference point to register the sub-locations. Device AEs can talk to the Device Name Service CSF 3502 via the Mca reference point to register themselves to obtain their names, or update their names when location or other context information changes. The device and name discovery can be carried out via the Mca reference point from any AEs to the Device Name Service CSF 3502, or via the Mcc reference point between Device name Service CSFs in different CSEs. As a result, all the corresponding messages and procedures proposed in Section 5.2 will apply to Mca and Mcc reference points.

Figure 36:
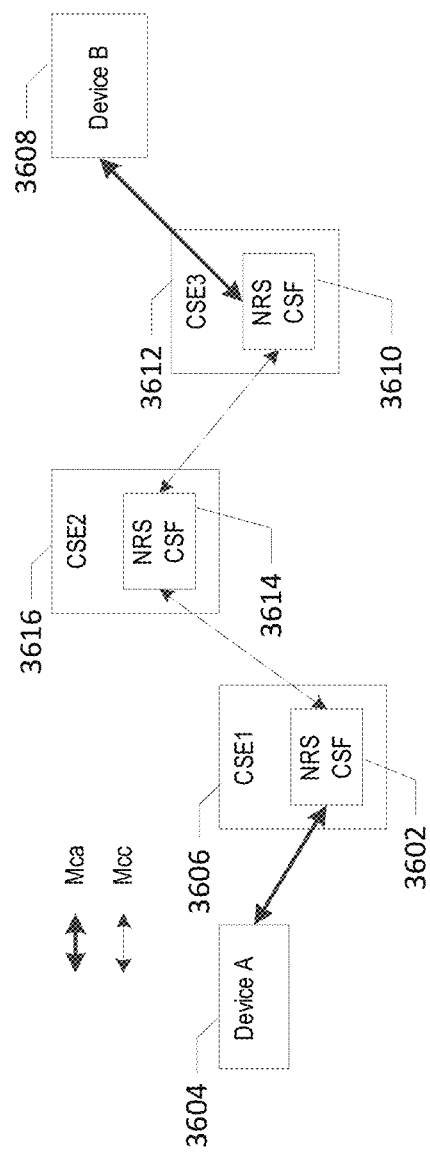
FIG. 36 is a diagram of an exemplary oneM2M embodiment with a name routing function hosted in a CSE as a new oneM2M CSF.

As another embodiment, the name routing function could be hosted in a CSE as a new oneM2M CSF, which is called Name Routing Service (NRS) CSF 3602. As shown in the exemplary deployment in FIG. 36, Device A 3604 connects to NRS CSF 3602 in CSE1 3606 over Mca interface, Device B 3608 connects to NRS CSF 3610 in CSE3 3612 over Mca interface as well. NRS CSF keeps a routing database with one entry for every possible destination. NRS CSF 3602, 3610, and 3614 in CSE1 3606, CSE2 3616 and CSE3 3612 exchange routing tables through Mcc interface to build more complete routing entries for routing the messages between Device A 3604 and Device B 3608.

In general, the device name scheme, naming service, and routing service discussed above may be implemented in an M2M service layer, such as the M2M service layers 22 and 22' of FIG. 38B. In particular, these mechanisms and procedures may be implemented as a service capability (SC) in a service layer, such as in a DSCL, GSCL, or NSCL of the ETSI M2M architecture, in a Service Capability Server (SCS) of the 3GPP MTC architecture, or in a CSF or CSE of the oneM2M architecture. It is understood that such a service capability (SC) may be implemented as a logical entity (e.g., software, computer-executable instructions, and the like) executing either on one or more standalone servers, computers, or other computing devices or nodes in an M2M system or as part of one or more existing servers, computers, or nodes of such system. For example, the service capability for device location management and privacy control described herein may be implemented on a server or computer such as that having the general architecture illustrated in FIG. 38C or FIG. 38D (described above).

Interfaces, such as Graphical User Interfaces (GUIs), can be used to assist user to control and/or configure functionalities related to device naming.

FIG. 37A is a diagram that illustrates an interface 3702. As discussed for Sub-location Registration Function, the building administrator may need to notify the IDNS about the sub-locations inside the building. For example, for a given building, the building administrator need to set the information to be included in the message defined in FIG. 10 (i.e., The Message Format of Sub-Location Registration), which include the data items such as the layer number, the upper-layer node, and the sub-locations or nodes on this layer. Therefore, a Graphic User Interface (GUI) 3702 can support the above operation. As can be seen that, the GUI 3702 is aligned with message structure defined in FIG. 10 (in other words, the user input from GUI 3702 is used to generate a message defined in FIG. 10).

FIG. 37B is a diagram that illustrates an interface 3704. Regarding to the Device Name Generation/Update Functions (which are responsible for generating or updating a globally unique name for an IoT Device in the domain respectively), GUI interface 3704 can be used for a user to add/update a device name. As can be seen in the figure, the user may first need to select which operation to be conducted, i.e., to add a new device through device name registration or to update an existing device name. Accordingly, for the first operation, the design of this GUI 3704 is aligned with message structure defined in FIG. 14 (in other words, the user input will be used for generating message defined in FIG. 14), and for the second operation, the design of this GUI 3704 is aligned with message structure defined in FIG. 19 (in other words, the user input will be used for generating message defined in FIG. 19).

It is to be understood that interfaces 3702 and 3704 can be produced using displays such as those shown in FIGS. 38 C-D described below.

Example M2M/IoT/WoT Communication System

FIG. 38A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities described herein including IDNS 902, Sub-location Registration Function 904, Sub-location Pool Manager 906, Device Registration Function 908, Device Name Generation Function 910, Device Name Update Function 912, Device Name Pool Manager 914 and Device and Name Discovery Function 916 of FIG. 9, subnetting functionality, Device Name Routing Functionality, Device Finding Functionality, Device Name Service CSF 3502 and NRS CSF 3602, logical entities to produce GUIs such as 2702 and 3704, as well as IoT devices and gateways with any such logical entities.

As shown in FIG. 38A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 38A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 38B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities described herein including IDNS 902, Sub-location Registration Function 904, Sub-location Pool Manager 906, Device Registration Function 908, Device Name Generation Function 910, Device Name Update Function 912, Device Name Pool Manager 914 and Device and Name Discovery Function 916 of FIG. 9, subnetting functionality, Device Name Routing Functionality, Device Finding Functionality, Device Name Service CSF 3502 and NRS CSF 3602, logical entities to produce GUIs such as 2702 and 3704, as well as IoT devices and gateways with any such logical entities. The M2M service layer 22 may be implemented by one or more servers, computers, devices, virtual machines (e.g. cloud/storage farms, etc.) or the like, including for example the devices illustrated in FIGS. 38C and 38D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 38B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities described herein including IDNS 902, Sub-location Registration Function 904, Sub-location Pool Manager 906, Device Registration Function 908, Device Name Generation Function 910, Device Name Update Function 912, Device Name Pool Manager 914 and Device and Name Discovery Function 916 of FIG. 9, subnetting functionality, Device Name Routing Functionality, Device Finding Functionality, Device Name Service CSF 3502 and NRS CSF 3602, logical entities to produce GUIs such as 2702 and 3704, as well as IoT devices and gateways with any such logical entities, may be hosted within a M2M service layer instance hosted by an M2M node, such as an M2M server, M2M gateway, or M2M device, as shown in FIG. 38B. For example, the logical entities described herein including IDNS 902, Sub-location Registration Function 904, Sub-location Pool Manager 906, Device Registration Function 908, Device Name Generation Function 910, Device Name Update Function 912, Device Name Pool Manager 914 and Device and Name Discovery Function 916 of FIG. 9, subnetting functionality, Device Name Routing Functionality, Device Finding Functionality, Device Name Service CSF 3502 and NRS CSF 3602, logical entities to produce GUIs such as 2702 and 3704, as well as IoT devices and gateways with any such logical entities, may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 38C or FIG. 38D described below.

Further, logical entities described herein including IDNS 902, Sub-location Registration Function 904, Sub-location Pool Manager 906, Device Registration Function 908, Device Name Generation Function 910, Device Name Update Function 912, Device Name Pool Manager 914 and Device and Name Discovery Function 916 of FIG. 9, subnetting functionality, Device Name Routing Functionality, Device Finding Functionality, Device Name Service CSF 3502 and NRS CSF 3602, logical entities to produce GUIs such as 2702 and 3704, as well as IoT devices and gateways with any such logical entities, can implemented as part of an M2M network that uses a Service Oriented Architecture (SOA) and/or a Resource-Oriented Architecture (ROA) to access services of the present application.

FIG. 38C is a block diagram of an example hardware/software architecture of a M2M network node 30, such as an M2M device 18, an M2M gateway 14, an M2M server, or the like. The node 30 can execute or include logical entities described herein including IDNS 902, Sub-location Registration Function 904, Sub-location Pool Manager 906, Device Registration Function 908, Device Name Generation Function 910, Device Name Update Function 912, Device Name Pool Manager 914 and Device and Name Discovery Function 916 of FIG. 9, subnetting functionality, Device Name Routing Functionality, Device Finding Functionality, Device Name Service CSF 3502 and NRS CSF 3602, logical entities to produce GUIs such as 2702 and 3704, as well as IoT devices and gateways with any such logical entities. The device 30 can be part of an M2M network as shown in FIG. 38A-B or part of a non-M2M network. As shown in FIG. 38C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 38C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 38C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 38C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 38D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities described herein including IDNS 902, Sub-location Registration Function 904, Sub-location Pool Manager 906, Device Registration Function 908, Device Name Generation Function 910, Device Name Update Function 912, Device Name Pool Manager 914 and Device and Name Discovery Function 916 of FIG. 9, subnetting functionality, Device Name Routing Functionality, Device Finding Functionality, Device Name Service CSF 3502 and NRS CSF 3602, logical entities to produce GUIs such as 2702 and 3704, as well as IoT devices and gateways with any such logical entities. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 38A and FIG. 38B, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities described herein including IDNS 902, Sub-location Registration Function 904, Sub-location Pool Manager 906, Device Registration Function 908, Device Name Generation Function 910, Device Name Update Function 912, Device Name Pool Manager 914 and Device and Name Discovery Function 916 of FIG. 9, subnetting functionality, Device Name Routing Functionality, Device Finding Functionality, Device Name Service CSF 3502 and NRS CSF 3602, logical entities to produce GUIs such as 2702 and 3704, as well as IoT devices and gateways with any such logical entities may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A server comprising a processor and a memory, the server being connected to a communications network, the server further including computer-executable instructions stored in the memory of the server which, when executed by the processor of the server, cause the server to:
    receive a first registration request to register a major location and a plurality of sub-locations within the major location;
    store the major location and the plurality of sub-locations;
    receive, from a network device of a plurality of network devices, a second registration request comprising a request for a name and information indicating a location description associated with the network device;
    determine, based on the location description associated with the network device, a matched major location and matched sub-location of the plurality of sub-locations that is already registered;
    generate a name for the network device with a location field and a label field, the location field including the matched major location and the matched sub-location, the label field including at least one of a unique identifier and a prefix for each network device of the plurality of network devices within a sub-location of the plurality of sub-locations;
    receive a request message indicating updated location information of the network device;
    update, based on the request message, the name and the location field;
    receive a discovery request message comprising an indication to locate the network device or one or more other network devices of the plurality of network devices at a given location;
    determine, based on the location field, one or more other network devices at the given location; and
    route, to the network device, based on a routing table generated based on a name and location field for plurality of network devices, one or more data packets.

2. The server of claim 1, wherein the plurality of network devices are Internet of Things (IoT) devices.

3. The server of claim 1, wherein the location field is hierarchically arranged with the major location followed by one or more sub-location identifiers associated with the plurality of sub-locations.

4. The server of claim 3, wherein the computer-executable instructions when executed by the processor further cause the server to:
    maintain a sub-location pool which contains the matched sub-location and other sub-locations of the plurality of sub-locations under the major location in a hierarchical way.

5. The server of claim 1, wherein the computer-executable instructions when executed by the processor further cause the server to:
    register sub-location names in a sub-location registration function.

6. The server of claim 5, wherein the computer-executable instructions when executed by the processor further cause the server to:
    assign one of the sub-location names to the network device based on a location of the network device and other context information associated with the network device.

7. The server of claim 1, wherein the computer-executable instructions when executed by the processor further cause the server to:
    receive a device name discovery request for the network device; and
    respond to the device name discovery request with the location field and the label field of the network device.

8. The server of claim 1, wherein the computer-executable instructions when executed by the processor further cause the server to:
    store a table that includes a hierarchical location tree for the plurality of network devices.

9. The server of claim 8, wherein the table associates each network device of the plurality of network devices with a Medium Access Control (MAC) address.

10. A method for use in a communications network, the method comprising:
    receiving a first registration request to register a major location and a plurality of sub-locations within the major location;
    storing the major location and the plurality of sub-locations;
    receiving, from a network device of a plurality of network devices, a second registration request comprising a request for a name and information indicating a location description associated with the network device;
    determining, based on the location description associated with the network device, a matched major location and matched sub-location of the plurality of sub-locations that is already registered;
    generating a name for the network device with a location field and a label field, the location field including the matched major location and matched sub-location, the label field including at least one of a unique identifier and a prefix for each network device of the plurality of network devices within a sub-location of the plurality of sub-locations;
    receiving a request message indicating updated location information of the network device;
    updating, based on the request message, the name and the location field;
    receiving a discovery request message comprising an indication to locate the network device or one or more other network devices of the plurality of network devices at a given location;
    determining, based on the location field, one or more other network devices at the given location; and
    routing, to the network device, based on a routing table generated based on a name and location field for plurality of network devices, one or more data packets.

11. The method of claim 10, wherein the plurality of network devices are Internet of Things (IoT) devices.

12. The method of claim 10, wherein the location field is hierarchically arranged with the major location followed by one or more sub-location identifiers associated with the plurality of sub-locations.

13. The method of claim 12, further comprising:
maintaining a sub-location pool which contains the matched sub-location and other sub-locations of the plurality of sub-locations under the major location in a hierarchical way.

14. The method of claim 10, further comprising:
registering sub-location names in a sub-location registration function.

15. The server of claim 1, wherein the major location comprises at least one of: a civil location, one or more coordinates, or a geohash.

16. The method of claim 10, wherein the major location comprises at least one of: a civil location, one or more coordinates, or a geohash.

17. A non-transitory computer-readable storage medium storing computer-readable instructions that, when executed by a processor of a computing device, cause the computing device to perform operations comprising:
receiving a first registration request to register a major location and a plurality of sub-locations within the major location;
storing the major location and the plurality of sub-locations;
receiving, from a network device of a plurality of network devices, a second registration request comprising a request for a name and information indicating a location description associated with the network device;
determining, based on the location description associated with the network device, a matched major location and matched sub-location of the plurality of sub-locations that is already registered;
generating a name for the network device with a location field and a label field, the location field including the matched major location and matched sub-location, the label field including at least one of a unique identifier and a prefix for each network device of the plurality of network devices within a sub-location of the plurality of sub-locations;
receiving a request message indicating updated location information of the network device;
updating, based on the request message, the name and the location field;
receiving a discovery request message comprising an indication to locate the network device or one or more other network devices of the plurality of network devices at a given location;
determine, based on the location field, one or more other network devices at the given location; and
routing, to the network device, based on a routing table generated based on a name and location field for plurality of network devices, one or more data packets.

18. The non-transitory computer-readable storage medium of claim 17, wherein the plurality of network devices are Internet of Things (IoT) devices.

19. The non-transitory computer-readable storage medium of claim 17, wherein the location field is hierarchically arranged with the major location followed by one or more sub-location identifiers associated with the plurality of sub-locations.

20. The non-transitory computer-readable storage medium of claim 17, further storing computer-readable instructions that, when executed by the processor of the computing device, cause the computing device to perform operations comprising:
maintaining a sub-location pool which contains the matched sub-location and other sub-locations of the plurality of sub-locations under the major location in a hierarchical way.

21. The non-transitory computer-readable storage medium of claim 17, further storing computer-readable instructions that, when executed by the processor of the computing device, cause the computing device to perform operations comprising:
registering sub-location names in a sub-location registration function.

22. The non-transitory computer-readable storage medium of claim 17, wherein the major location comprises at least one of: a civil location, one or more coordinates, or a geohash.

* * * * *